US012738119B2

(12) United States Patent
Tanaka et al.

(10) Patent No.: US 12,738,119 B2
(45) Date of Patent: Sep. 15, 2026

(54) CASSETTE MOUNTING APPARATUS, MONEY HANDLING APPARATUS, AND MONEY HANDLING SYSTEM

(71) Applicant: Glory Ltd., Himeji (JP)

(72) Inventors: Hidekazu Tanaka, Hyogo (JP); Mitsuo Tanaka, Hyogo (JP); Ryoma Kuroki, Hyogo (JP)

(73) Assignee: GLORY LTD., Himeji (JP)

( * ) Notice: Subject to any disclaimer, the term of this patent is extended or adjusted under 35 U.S.C. 154(b) by 1254 days.

(21) Appl. No.: 17/669,361

(22) Filed: Feb. 11, 2022

(65) Prior Publication Data

US 2022/0270428 A1 Aug. 25, 2022

(30) Foreign Application Priority Data

Feb. 19, 2021 (JP) ................................ 2021-025276

(51) Int. Cl.
*G07D 11/125* (2019.01)
*G07D 11/40* (2019.01)

(52) U.S. Cl.
CPC .......... *G07D 11/125* (2019.01); *G07D 11/40* (2019.01); *G07D 2211/00* (2013.01)

(58) Field of Classification Search
CPC .. G07D 11/40; G07D 11/125; G07D 2211/00; G07D 11/12; G07D 11/13; G07D 11/14; G07D 11/10; G07D 11/135; G07D 2201/00; G07D 13/00; G07D 11/00; G07F 19/202; G07F 19/203
See application file for complete search history.

(56) References Cited

U.S. PATENT DOCUMENTS 7,597,520 B2 * 10/2009 Zobel .................... G01N 35/04 210/695
8,360,224 B2 * 1/2013 Park ..................... G07F 19/205 902/13
9,141,876 B1 * 9/2015 Jones .................... G07D 11/30
2001/0054643 A1 12/2001 Siemens
2008/0082207 A1 * 4/2008 Sjostrom ................. G07D 9/02 700/231
2008/0171508 A1 7/2008 Enomoto et al.
2012/0012435 A1 * 1/2012 Roosch ................. G07D 11/40 194/206
2012/0037580 A1 * 2/2012 Kim ...................... G07D 11/12 188/290
2014/0060997 A1 * 3/2014 Doi ....................... G07D 11/24 194/206

(Continued)

FOREIGN PATENT DOCUMENTS

JP 5002794 B2 8/2012

OTHER PUBLICATIONS

Extended European Search Report issued Jun. 28, 2022, in European Application No. 22155022.1.

*Primary Examiner* — Jeffrey A Shapiro
(74) *Attorney, Agent, or Firm* — XSENSUS LLP

(57) ABSTRACT

A cassette mounting apparatus includes an apparatus-side connector connectable to a cassette-side connector of a cassette that stores money, a cassette mounting section that enables the cassette to be mounted therein, and a connection processing section that connects the apparatus-side connector to the cassette-side connector by moving the apparatus-side connector in a direction closer to the cassette-side connector.

14 Claims, 12 Drawing Sheets

(56) References Cited

U.S. PATENT DOCUMENTS

| | | | | |
|---|---|---|---|---|
| 2015/0302678 | A1* | 10/2015 | Blake | G07D 9/06 453/62 |
| 2018/0286164 | A1* | 10/2018 | Lee | G07F 19/205 |
| 2020/0372745 | A1* | 11/2020 | Onishi | G07D 9/008 |
| 2022/0051212 | A1* | 2/2022 | Forutanpour | G07F 7/005 |

* cited by examiner

CASSETTE MOUNTING APPARATUS, MONEY HANDLING APPARATUS, AND MONEY HANDLING SYSTEM

CROSS REFERENCE TO RELATED APPLICATIONS

The disclosure of Japanese Patent Application No. 2021-025276 filed on Feb. 19, 2021 including the specification, drawings and abstract is incorporated herein by reference in its entirety.

TECHNICAL FIELD

The present disclosure relates to a cassette mounting apparatus, a money handling apparatus, and a money handling system.

BACKGROUND ART

Hitherto there is a known configuration in which a coin replenishment safety box is attached to a coin depositing and dispensing machine and coins stored in the coin replenishment safety box are replenished in the coin depositing and dispensing machine (refer to, for example, PTL 1). PTL 1 describes a configuration in which an operator pushes the coin replenishment safety box along the rail of the coin depositing and dispensing machine to attach the coin replenishment safety box to the coin depositing and dispensing machine and, at the same time, connects a connector of the coin replenishment safety box to a connector of the coin depositing and dispensing machine.

CITATION LIST

Patent Literature

PTL 1
Japanese Patent No. 5002794

SUMMARY (1) A cassette mounting apparatus according to the present disclosure comprises an apparatus-side connector connectable to a cassette-side connector of a cassette that stores money, a cassette mounting section that enables the cassette to be mounted therein, and a connection processing section that connects the apparatus-side connector to the cassette-side connector by moving the apparatus-side connector in a direction closer to the cassette-side connector.

(14) A money handling system according to the present disclosure comprises a cassette adapted to store money and comprising a cassette-side connector, a first cassette mounting apparatus, and a second cassette mounting apparatus. The first cassette mounting apparatus comprises a first apparatus-side connector adapted to be connected to the cassette-side connector, a first cassette mounting section adapted to enable the cassette to be mounted therein, and a first connection processing section adapted to connect the first apparatus-side connector to the cassette-side connector by moving the first apparatus-side connector in a direction closer to the cassette-side connector. The second cassette mounting apparatus comprises a second cassette mounting section adapted to enable the cassette to be mounted therein and a second apparatus-side connector adapted to be connected to the cassette-side connector with the cassette mounted in the second cassette mounting section. The cassette is also configured such that when it is mounted in the first cassette mounting apparatus, its orientation thereto is different from its orientation when it is mounted in the second cassette mounting apparatus.

DESCRIPTION OF EMBODIMENTS

Figure 1A:
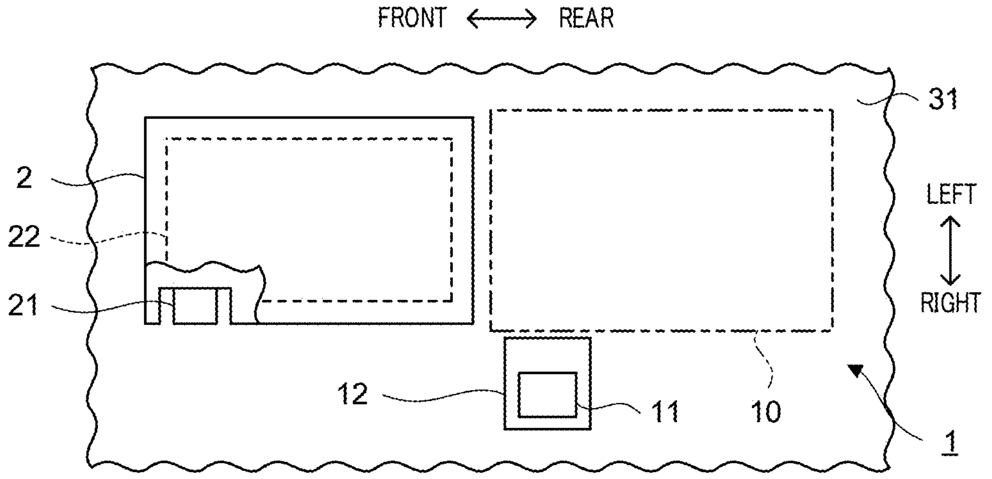
FIG. 1A is a plan view of a cassette mounting apparatus according to Embodiment 1.

According to the configuration described in PTL 1, the coin replenishment safety box is mounted by pushing it into the coin depositing and dispensing machine, and at the same time the connector of the coin replenishment safety box is connected to the connector of the coin depositing and dispensing machine. When the connector is misaligned due to dimensional errors or backlash, the force with which an operator pushes the coin replenishment safety box may be directly exerted on the connector, resulting in damage to the connector.

The present disclosure provides a cassette mounting apparatus, a money handling apparatus, and a money handling system capable of mounting a cassette while preventing damage to at least one of a cassette-side connector and an apparatus-side connector at the time of connection of cassette-side connector with the apparatus-side connector.

(2) In the cassette mounting apparatus according to the present disclosure, the connection processing section may move the apparatus-side connector in the direction closer to the cassette-side connector in conjunction with a movement of the cassette when the cassette is mounted in the cassette mounting section.

(3) In the cassette mounting apparatus according to the present disclosure, the connection processing section may comprise an interlocking section that moves in conjunction with the movement of the cassette when the cassette is mounted in the cassette mounting section and a moving section that moves the apparatus-side connector in a direction closer to the cassette-side connector in accordance with the movement of the interlocking section.

(4) In the cassette mounting apparatus according to the present disclosure, the interlocking section may be pressed while being in contact with the cassette in accordance with the movement of the cassette when the cassette is mounted in the cassette mounting section so as to move in conjunction with the movement of the cassette.

(5) in the cassette mounting apparatus according to the present disclosure, the moving section may comprise an extensible section that extends to move the apparatus-side connector in the direction closer to the cassette-side connector.

(6) In the cassette mounting apparatus according to the present disclosure, the extensible section may extend and contract in a direction perpendicular to a movement direction of the cassette when the cassette is mounted in the cassette mounting section. In the cassette mounting apparatus according to the present disclosure, the moving section may comprise a contraction urging section that urges the extensible section to contract the extensible section.

(7) In the cassette mounting apparatus according to the present disclosure, the moving section may move the apparatus-side connector in a direction that crosses the movement direction of the cassette when the cassette is mounted in the cassette mounting section.

(8) In the cassette mounting apparatus according to the present disclosure, the cassette mounting section may comprise a cassette container that stores the cassette and a container insertion section into which the cassette container is inserted so that the cassette stored in the cassette container is mounted, and the interlocking section may move in conjunction with the movement of the cassette container when the cassette container is inserted into the container insertion section.

(9) In the cassette mounting apparatus according to the present disclosure, the apparatus-side connector and the moving section may be provided in the cassette container. The interlocking section may comprise an interlocking member provided in the cassette container and an interlocking control section provided in the container insertion section, and the interlocking control section may move the interlocking member in conjunction with the movement of the cassette container. The moving section may move the apparatus-side connector in the direction closer to the cassette-side connector in accordance with the movement of the interlocking member.

(10) In the cassette mounting apparatus according to the present disclosure, a removal direction of the cassette container may be opposite to the insertion direction of the cassette container, and the moving section may comprise a holding member that holds the apparatus-side connector such that the apparatus-side connector is positioned on the insertion direction side of the cassette stored in the cassette container and that is movable in the insertion direction, a moving member that is provided on the removal direction side of the holding member and that moves in the removal direction in accordance with the movement of the interlocking section when the cassette container is inserted into the container insertion section, and an elastic section that separably connects the holding member to the moving member.

(11) The cassette mounting apparatus according to the present disclosure may further comprise an urging section that urges the holding member in the insertion direction. The urging section may urge the holding member in the insertion direction by using a force less than an elastomeric force of the elastic section and greater than a connection force that is a force to maintain the connection between the cassette-side connector and the apparatus-side connector.

(12) A money handling apparatus according to the present disclosure comprises the cassette mounting apparatus having any one of configurations (4) to (7) described above and the cassette mounting apparatus having any one of configurations (8) to (11) described above.

(13) A money handling system according to the present disclosure comprises a cassette that stores money and that comprises a cassette-side connector, a first money handling apparatus that comprises the cassette mounting apparatus having any one of the configurations (4) to (7) described above, and a second money handling apparatus that comprises the cassette mounting apparatus having any configurations (8) to (11) described above.

(15) The money handling system according to the present disclosure may comprise a first money handling apparatus that comprises the first cassette mounting apparatus and a second money handling apparatus that comprises the second cassette mounting apparatus.

According to the cassette mounting apparatus, the money handling apparatus, and the money handling system of the present disclosure, a cassette can be mounted while preventing damage to at least one of the cassette-side connector and the apparatus-side connector at the time of connection of the cassette-side connector with the apparatus-side connector.

Embodiment 1

Embodiment 1 according to the present disclosure is described below.

<Configuration of Cassette Mounting Apparatus>

The configuration of a cassette mounting apparatus is described first. FIG. 1A is a plan view of the cassette mounting apparatus according to Embodiment 1. Note that the arrangement and movement of the configurations of the cassette mounting apparatus may be described by using the directions illustrated in FIG. 1A.

A cassette mounting apparatus 1 illustrated in FIG. 1A is provided in, for example, a money handling apparatus (not illustrated) that takes in money stored in a cassette 2 and feeds money into the cassette 2 in response to an operator's operation. Note that the money stored in the cassette 2 may be a coin or a banknote. In addition, according to Embodiments 1 and 2, the configuration in which the cassette mounting apparatus 1 is provided on top of the money handling apparatus is described as an example. The cassette mounting apparatus 1 may be provided inside of or on the side surface portion of a money loading apparatus. The cassette mounting apparatus 1 comprises a cassette mounting section 10, an apparatus-side connector 11, and a connection processing section 12.

The cassette mounting section 10 is provided on, for example, part of the upper surface 31 of the money loading apparatus. A cassette 2 is mounted in the cassette mounting section 10. The cassette mounting section 10 may comprise a misalignment prevention section (not illustrated). The misalignment prevention section prevents misalignment of the cassette 2 mounted in the cassette mounting section 10 in at least one of the horizontal and vertical directions.

A cassette-side connector 21 (described below) of the cassette 2 is connected to the apparatus-side connector 11.

The connection processing section 12 connects the cassette-side connector 21 to the apparatus-side connector 11 by moving the apparatus-side connector 11 in a direction closer to the cassette-side connector 21. As a configuration of the connection processing section 12 to move the apparatus-side connector 11, a widely used configuration such as an expansion/contraction mechanism, a link mechanism, a rack and pinion mechanism, or a gear mechanism can be used. As the expansion/contraction mechanism, a pantograph mechanism, a cylinder piston mechanism, or the like can be used.

The cassette 2 comprises the cassette-side connector 21, a storage area 22 for storing money, an inlet (not illustrated) through which money is stored in the storage area 22, and an outlet (not illustrated) through which the money stored in the storage area 22 is discharged. However, the cassette 2 may store money in the storage area 22 without comprising the inlet and the outlet, and may comprise one opening for discharging the money stored in the storage area 22.

Note that the connection between the apparatus-side connector 11 and the cassette-side connector 21 may enable communication between the money handling apparatus having the cassette mounting apparatus 1 installed therein and a control section (not illustrated) of the cassette 2. If the cassette 2 has a mechanism that is driven by electric power, the money handling apparatus may supply electric power to the cassette 2.

<Operation Performed by Cassette Mounting Apparatus>

Figure 1B:
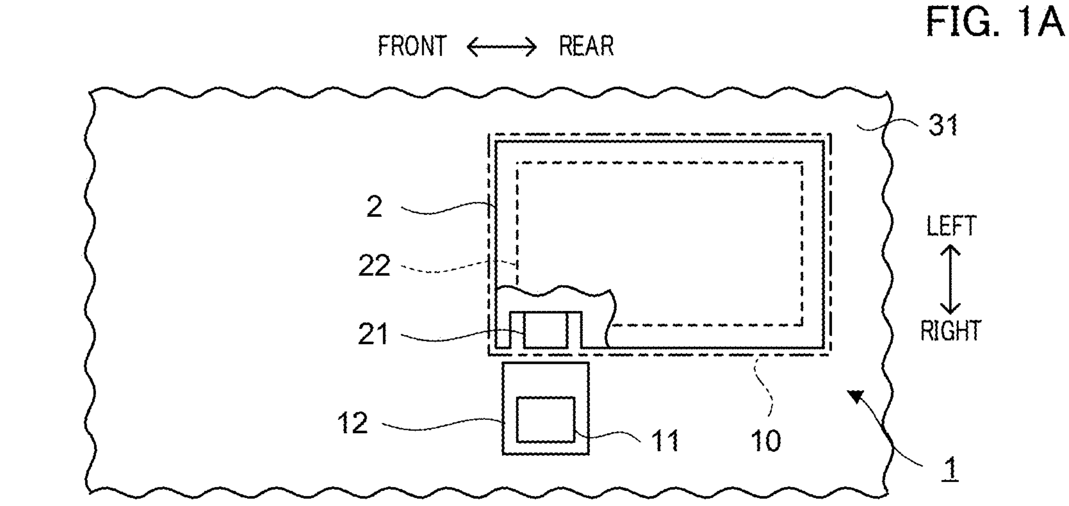
FIG. 1B illustrates the operation performed by the cassette mounting apparatus (the state subsequent to that illustrated in FIG. 1A) according to Embodiment 1.
Figure 1C:
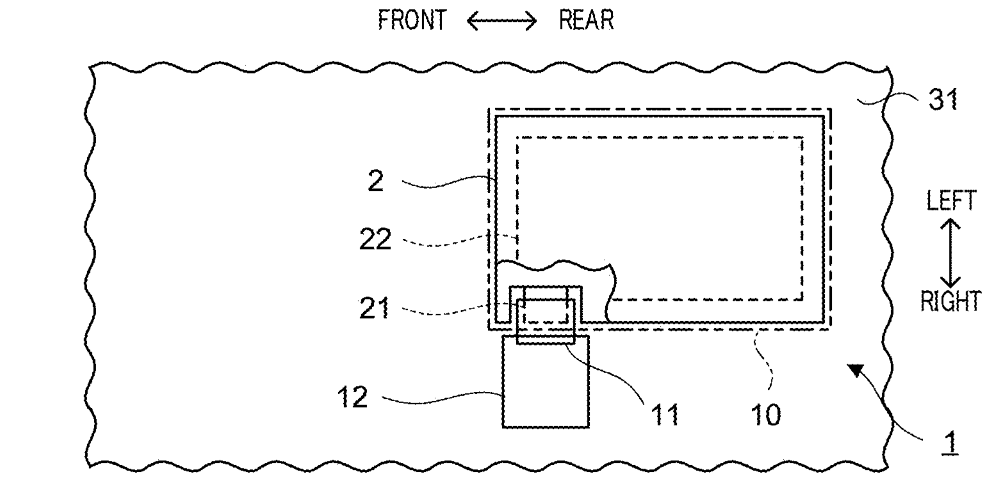
FIG. 1C illustrates the operation performed by the cassette mounting apparatus (the state subsequent to that illustrated in FIG. 1B) according to Embodiment 1.

The operation performed by the cassette mounting apparatus 1 is described below. FIG. 1B illustrates the operation performed by the cassette mounting apparatus according to Embodiment 1 (the operation subsequent to that illustrated in FIG. 1A). FIG. 1C illustrates the operation performed by the cassette mounting apparatus according to Embodiment 1 (the operation subsequent to that illustrated in FIG. 1B).

The operator, for example, places the cassette 2 on the upper surface 31 at the position illustrated in FIG. 1A and slides the cassette 2 in the rearward direction. Then, as illustrated in FIG. 1B, the operator mounts the cassette 2 in the cassette mounting section 10. After completion of mounting the cassette 2 in the cassette mounting section 10, the connection processing section 12 moves the apparatus-side connector 11 to the left and connects the apparatus-side connector 11 to the cassette-side connector 21, as illustrated in FIG. 1C. That is, the connection processing section 12 moves the apparatus-side connector 11 such that the rearward direction, which is the movement direction of the cassette 2 when the cassette 2 is mounted in the cassette mounting section 10, crosses the left direction, which is the movement direction of the apparatus-side connector 11 when the apparatus-side connector 11 is connected to the cassette-side connector 21. Note that as a configuration of the connection processing section 12 for moving the apparatus-side connector 11 to the left after completion of mounting the cassette 2, a configuration can be employed in which a power source, such as an electric motor, causes the connection processing section 12 to operate on the basis of the detection result of a sensor that detects the movement or position of the cassette 2. Alternatively, a configuration may be employed in which an operation unit to be manually operated by an operator is provided in the cassette mounting apparatus 1 and, after completion of mounting the cassette 2, the connection processing section 12 is activated to move the apparatus-side connector 11 via the operation of the operation unit.

Effects of Embodiment 1

The cassette mounting apparatus 1 comprises the connection processing section 12 that moves the apparatus-side connector 11 and connects the apparatus-side connector 11 to the cassette-side connector 21. As a result, it is prevented that the force with which the operator moves the cassette 2 is exerted directly on the cassette-side connector 21 and the apparatus-side connector 11. In this way, the cassette 2 can be mounted in the cassette mounting apparatus 1 while preventing damage to at least one of the cassette-side connector 21 and the apparatus-side connector 11.

The cassette mounting apparatus 1 and the cassette 2 are configured such that the movement direction of the cassette 2 when the cassette 2 is mounted in the cassette mounting section 10 and the movement direction of the apparatus-side connector 11 when the apparatus-side connector 11 is connected to the cassette-side connector 21 cross each other. Thus, the movement direction of the cassette 2 when the cassette 2 is mounted in the cassette mounting section 10 and the movement direction of the apparatus-side connector 11 when the apparatus-side connector 11 is connected to the cassette-side connector 21 can be controlled to appropriate directions in accordance with the size of the money handling apparatus, the location at which the cassette mounting apparatus 1 is disposed in the money handling apparatus, the size of the cassette 2, and the locations of the inlet and the outlet. In this manner, the design freedom of the money handling apparatus, the cassette mounting apparatus 1, and the cassette 2 can be increased.

Modification of Embodiment 1

The cassette mounting apparatus 1 and the cassette 2 are configured so that the movement direction of the cassette 2 when the cassette 2 is mounted in the cassette mounting section 10 is the rearward direction. However, the cassette mounting apparatus 1 and the cassette 2 may be configured so that the movement direction of the cassette 2 is a direction other than the rearward direction. For example, the cassette mounting apparatus 1 and the cassette 2 may be configured so that the movement direction of the cassette 2 is the right direction, downward direction, or diagonally rearward right direction. In addition, the cassette mounting apparatus 1 and the cassette 2 are configured so that the movement direction of the apparatus-side connector 11 when the apparatus-side connector 11 is connected to the cassette-side connector 21 is the left direction. However, the cassette mounting apparatus 1 and the cassette 2 may be configured so that the movement direction of the apparatus-side connector 11 is a direction other than the left direction. For example, the cassette mounting apparatus 1 and the cassette 2 may be configured so that the movement direction of the apparatus-side connector 11 is the frontward direction, downward direction, or diagonally frontward left direction. The cassette mounting apparatus 1 and cassette 2 may be configured so that the movement direction of the cassette 2 when the cassette 2 is mounted in the cassette mounting section 10 is parallel to the movement direction of the apparatus-side connector 11 when the apparatus-side connector 11 is connected to the cassette-side connector 21.

Embodiment 2

Embodiment 2 according to the present disclosure is described below.

<Configuration of Cassette Mounting Apparatus>

Figure 2A:
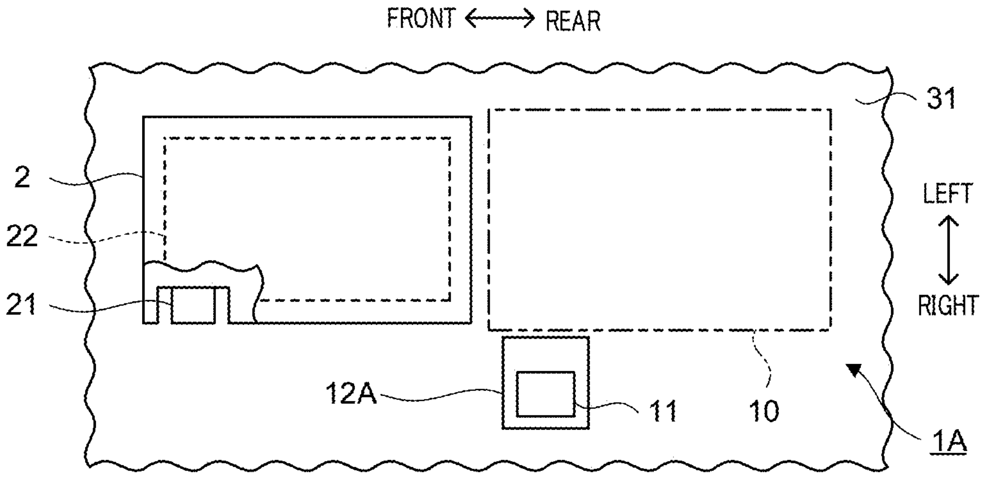
FIG. 2A is a plan view of a cassette mounting apparatus according to Embodiment 2.

The configuration of the cassette mounting apparatus is described first. FIG. 2A is a plan view of the cassette mounting apparatus according to Embodiment 2. Note that description of a configuration the same as in Embodiment 1 is simplified or is not repeated. In this example, the movement direction of the cassette 2 when the cassette 2 is mounted in the cassette mounting section 10 and the movement direction of the apparatus-side connector 11 when the apparatus-side connector 11 is connected to the cassette-side connector 21 are the same as those in Embodiment 1. The movement direction of the cassette 2 when the cassette 2 is mounted in the cassette mounting section 10, the movement direction of the apparatus-side connector 11 when the apparatus-side connector 11 is connected to the cassette-side connector 21, and the relationship between the two movement directions may be those described in a modification of Embodiment 1.

A cassette mounting apparatus 1A illustrated in FIG. 2A comprises the cassette mounting section 10, the apparatus-side connector 11, and a connection processing section 12A.

The connection processing section 12A is the same as the connection processing section 12 according to Embodiment 1 in that the connection processing section 12A moves the apparatus-side connector 11 when connecting the cassette-side connector 21 to the apparatus-side connector 11. However, unlike the connection processing section 12 according to Embodiment 1, the connection processing section 12 moves the apparatus-side connector 11 in conjunction with the movement of the cassette 2 when the cassette 2 is mounted in the cassette mounting section 10.

The connection processing section 12A may comprise an interlocking section that moves in conjunction with the movement of the cassette 2 when the cassette 2 is mounted in the cassette mounting section 10 and a moving section that moves the apparatus-side connector 11 in accordance with the movement of the interlocking section. The interlocking section can have a widely used configuration that maintains contact with the cassette 2 and, thus, moves, rotates, and pivots in conjunction with the movement of the cassette 2. The moving section can have the configuration for moving the apparatus-side connector 11 described in Embodiment 1 as an example.

Note that as the configuration for moving the apparatus-side connector 11 in conjunction with the movement of the cassette 2 when the cassette 2 is mounted in the cassette mounting section 10, a configuration can be employed in which a power source, such as an electric motor, causes the connection processing section 12A to operate on the basis of the detection result of a sensor that detects the movement or the position of the cassette 2. Alternatively, a configuration may be employed in which an operation unit to be manually operated by an operator in conjunction with the movement of the cassette 2 is provided in the cassette mounting apparatus 1A, and the connection processing section 12A is activated to move the apparatus-side connector 11 via the operation performed on the operation unit.

<Operation Performed by Cassette Mounting Apparatus)

Figure 2B:
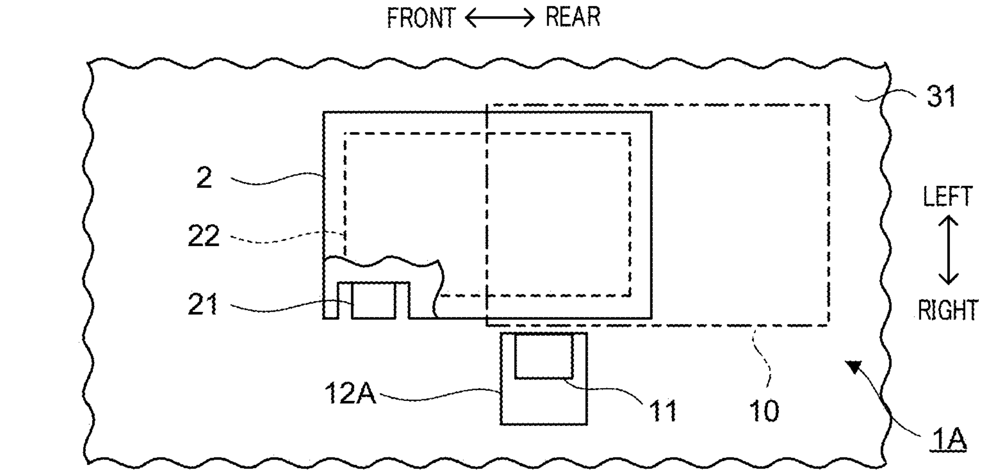
FIG. 2B illustrates the operation performed by the cassette mounting apparatus (the state subsequent to that illustrated in FIG. 2A) according to Embodiment 2.
Figure 2C:
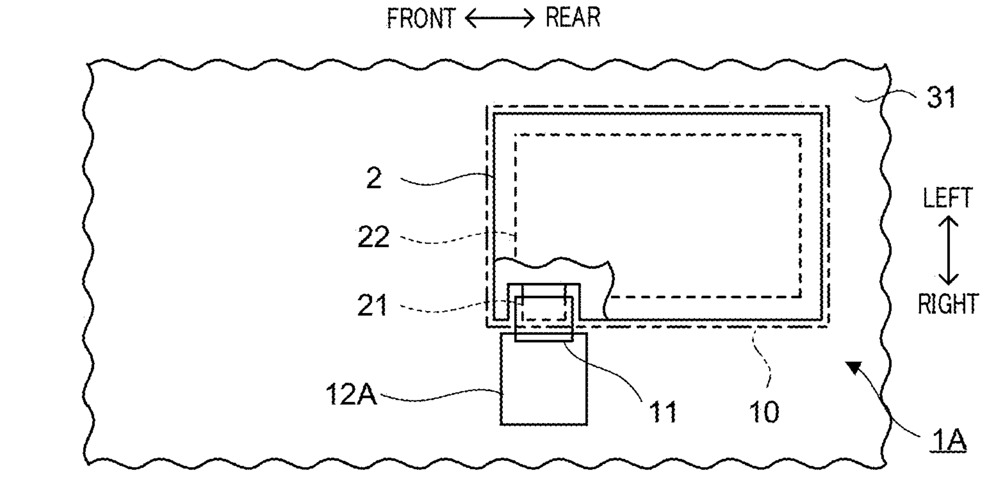
FIG. 2C illustrates the operation performed by the cassette mounting apparatus (the state subsequent to that illustrated in FIG. 2B) according to Embodiment 2.

The operation performed by the cassette mounting apparatus 1A is described below. FIG. 2B illustrates the operation performed by the cassette mounting apparatus according to Embodiment 2 (the operation subsequent to that described in FIG. 2A). FIG. 2C illustrates the operation performed by the cassette mounting apparatus according to Embodiment 2 (the operation subsequent to that described in FIG. 2B).

The operator places the cassette 2 at the position illustrated in FIG. 2A and slides the cassette 2 in the rearward direction first. As illustrated in FIG. 2B, when the cassette 2 is slid, the connection processing section 12A moves the apparatus-side connector 11 to the left in synchronization with the slide of the cassette 2. The connection processing section 12A continues to move the apparatus-side connector 11 in synchronization with the slide of the cassette 2. As illustrated in FIG. 2C, the connection processing section 12A moves the apparatus-side connector 11 so that the apparatus-side connector 11 is connected to the cassette-side connector 21 when the cassette 2 is mounted in the cassette mounting section 10. Note that the timing of the completion of mounting the cassette 2 may be the same as or different from the timing of the completion of the connection of the connector.

Effects of Embodiment 2

According to Embodiment 2, in addition to the effects of Embodiment 1, effects described below can be obtained. The connection processing section 12A of the cassette mounting apparatus 1A moves the apparatus-side connector 11 and connects the apparatus-side connector 11 to the cassette-side connector 21 in conjunction with the movement of the cassette 2 when the cassette 2 is mounted in the cassette mounting section 10. This reduces the time required for mounting the cassette 2 and connecting the apparatus-side connector 11 to the cassette-side connector 21. In addition, mounting of the cassette 2 and connecting of the apparatus-side connector 11 to the cassette-side connector 21 can be completed in one go.

Embodiment 3

Embodiment 3 according to the present disclosure is described below.

<Configuration of Money Handling Apparatus>

Figure 3A:
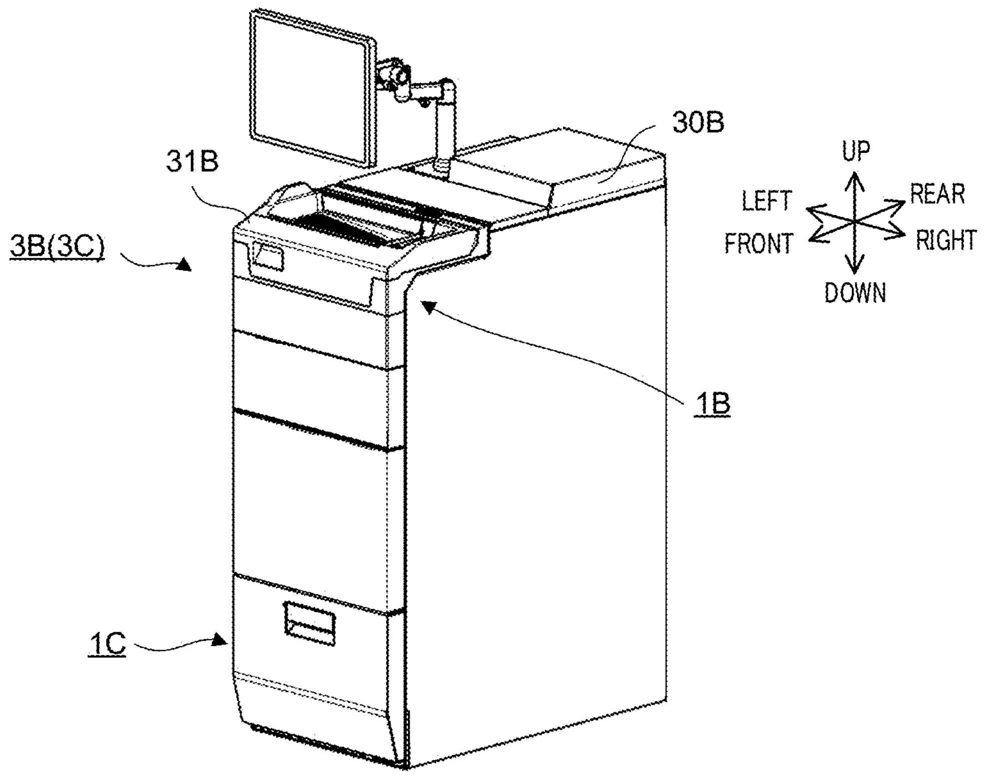
FIG. 3A is a perspective view of a money handling apparatus according to Embodiments 3 and 4.

The configuration of the money handling apparatus in which the cassette mounting apparatus is mounted is described first. FIG. 3A is a perspective view of the money handling apparatus according to Embodiments 3 and 4.

A money handling apparatus 3B illustrated in FIG. 3A takes in and dispense money in response to an operator's operation. The money handling apparatus 3B is disposed in, for example, the back office of a store.

As used herein, the term "front side" of the money handling apparatus 3B refers to the side adjacent to the operator who puts money into the money handling apparatus 3B, and the term "rear side" of the money handling apparatus is referred to as the side opposite to the side adjacent to the operator. That is, the "front side" of the money handling apparatus 3B means the side on which an inlet 32B (described below) is provided to take money into the money handling apparatus 3B. In addition, the terms "left side" and "right side" of the money handling apparatus 3B refer to the left side and right side of an operator who performs at least one of the operations of putting in and taking out money. In addition, the terms "upper side" and the "lower side" of the money handling apparatus 3B refer to the upper side and the lower side of the operator who operates the money handling apparatus 3B.

The money handling apparatus 3B comprises a main body 30B. Inside the main body 30B, a feeding unit that feeds the money that is put in into a transport path, a transport unit that transports the money, a recognition unit that identifies the money, a storage unit that stores the money, and a control section that controls each of the units are disposed. The money handling apparatus 3B according to Embodiment 3 has a deposit function of storing, in the storage unit, the money stored in the cassette 2B mounted in a cassette mounting apparatus 1B. For example, a cover 31B that opens rearward is provided in the front and upper portion of the main body 30B.

<Configuration of Cassette>

Figure 3B:
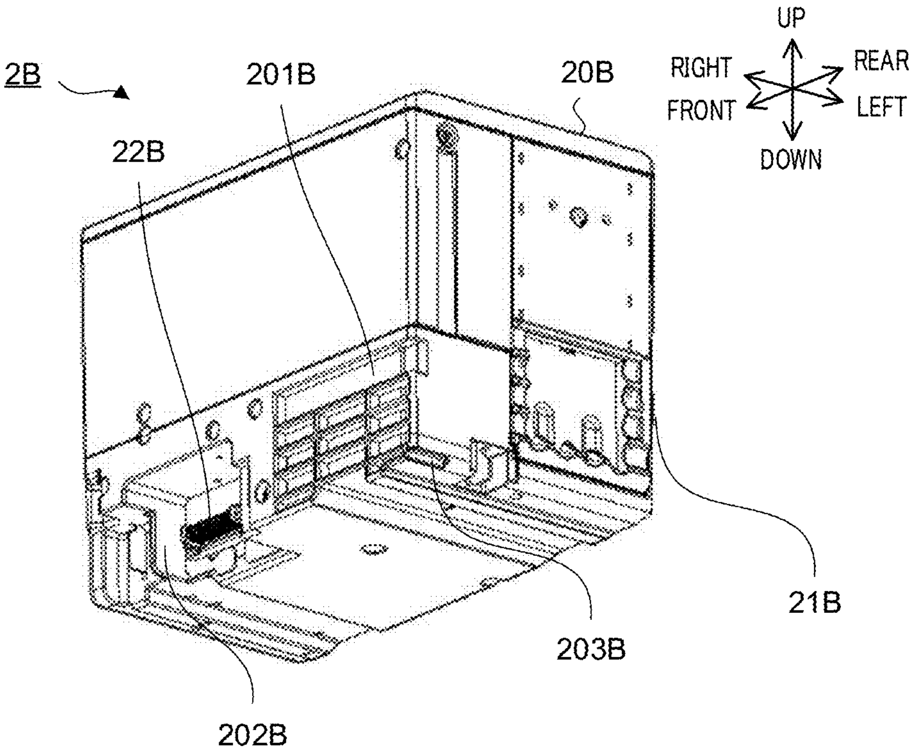
FIG. 3B is a perspective view of a cassette according to Embodiments 3 and 4.

The configuration of the cassette to be mounted in the cassette mounting apparatus is described below. FIG. 3B is a perspective view of a cassette according to Embodiments 3 and 4.

The cassette 2B illustrated in FIG. 3B comprises a housing 20B, an outlet 21B, and a cassette-side connector 22B.

The housing 20B is formed in the shape of a box. The interior space of the housing 20B forms a storage area (not illustrated) that allows money to be stored therein. A feeding unit (not illustrated) is provided inside of the housing 20B. The feeding unit discharges the money stored in the storage area. A guide groove 201B is provided on the rear side of a right surface portion of the housing 20B so as to extend in the front-rear direction. A recessed portion 202B that is concave to the left is provided in the front and lower side of the right surface portion of the housing 20B. The rear surface of the recessed portion 202B is inclined so that the right side is located more rearward than the left side (refer to FIGS. 5 and 7). A pressure portion 203B is provided on the rear surface portion of the housing 20B at the lower right end. An inlet (not illustrated) is formed in the upper surface portion of the housing 20B to take money into the storage area.

The outlet 21B is formed in the rear surface portion of the housing 20B. The outlet 21B is opened and closed by the outlet opening/closing section (not illustrated) provided inside of the housing 20B. When the outlet 21B is open, the money in the storage area is dispensed.

The cassette-side connector 22B is provided inside of the recessed portion 202B of the housing 20B.

<Configuration of Cassette Mounting Apparatus>

Figure 4:
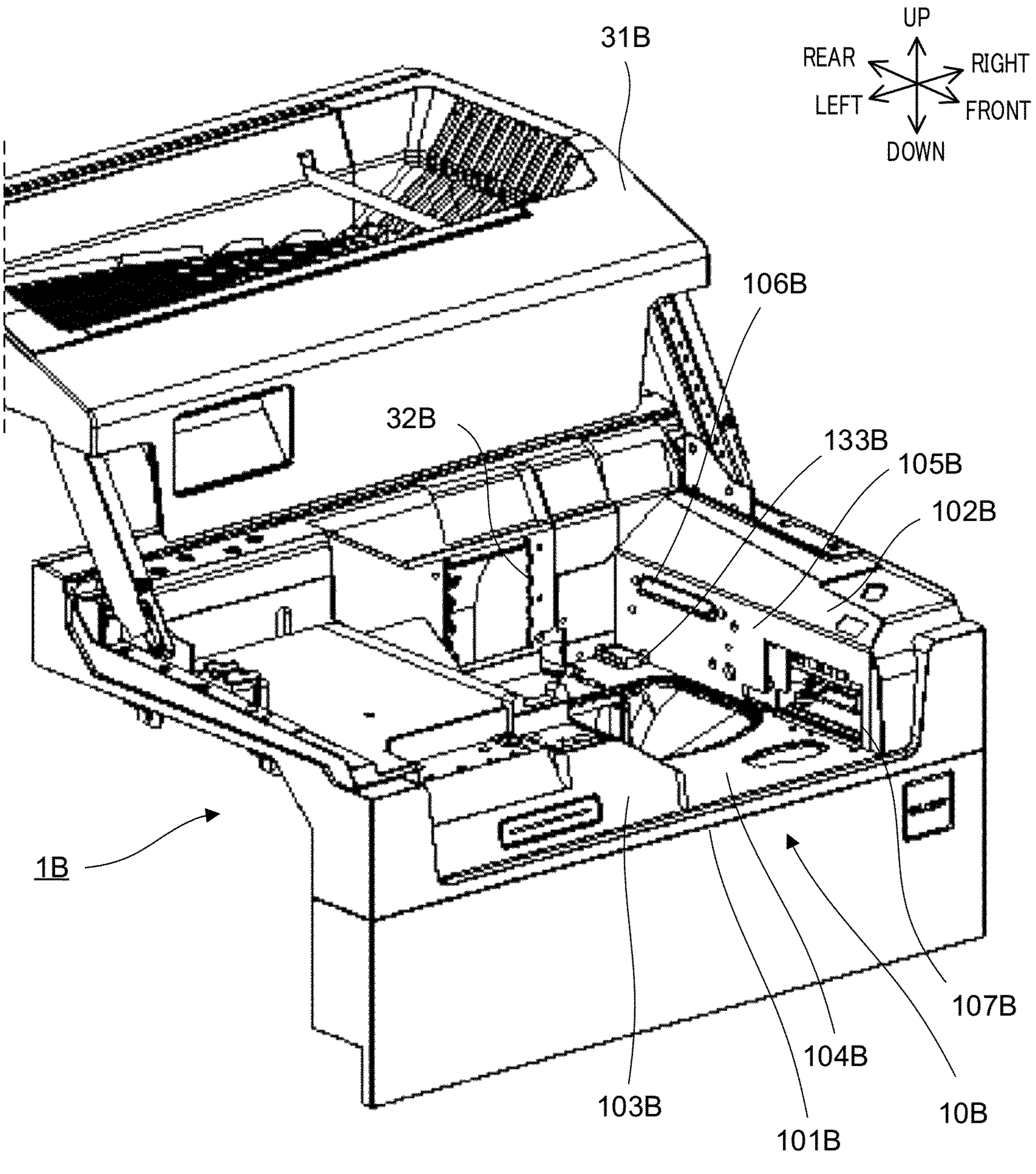
FIG. 4 is a perspective view of the cassette mounting apparatus with a cassette dismounted according to Embodiment 3.
Figure 5:
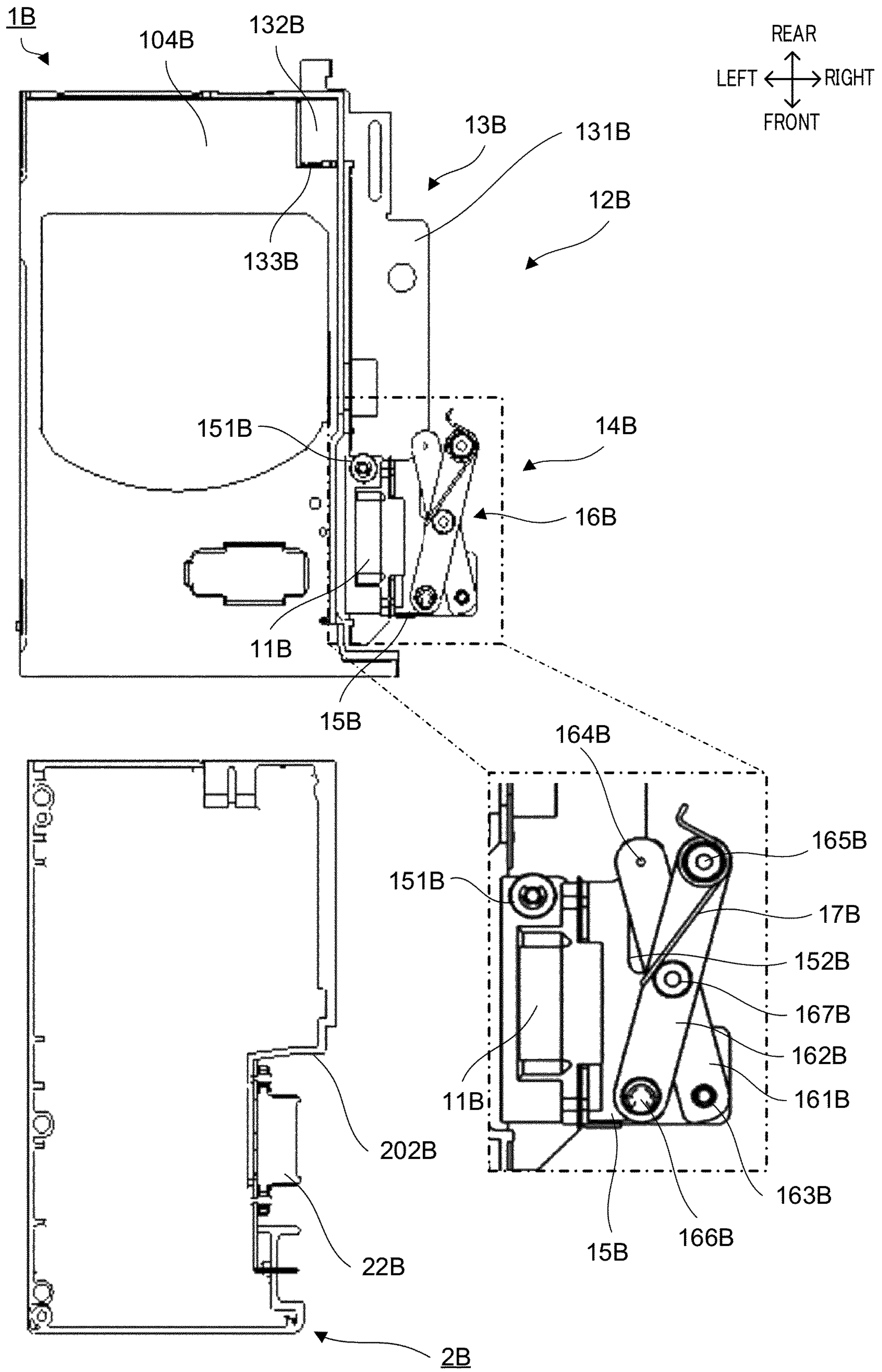
FIG. 5 is a schematic transverse sectional view of the cassette mounting apparatus and the cassette according to Embodiment 3.
Figure 6:
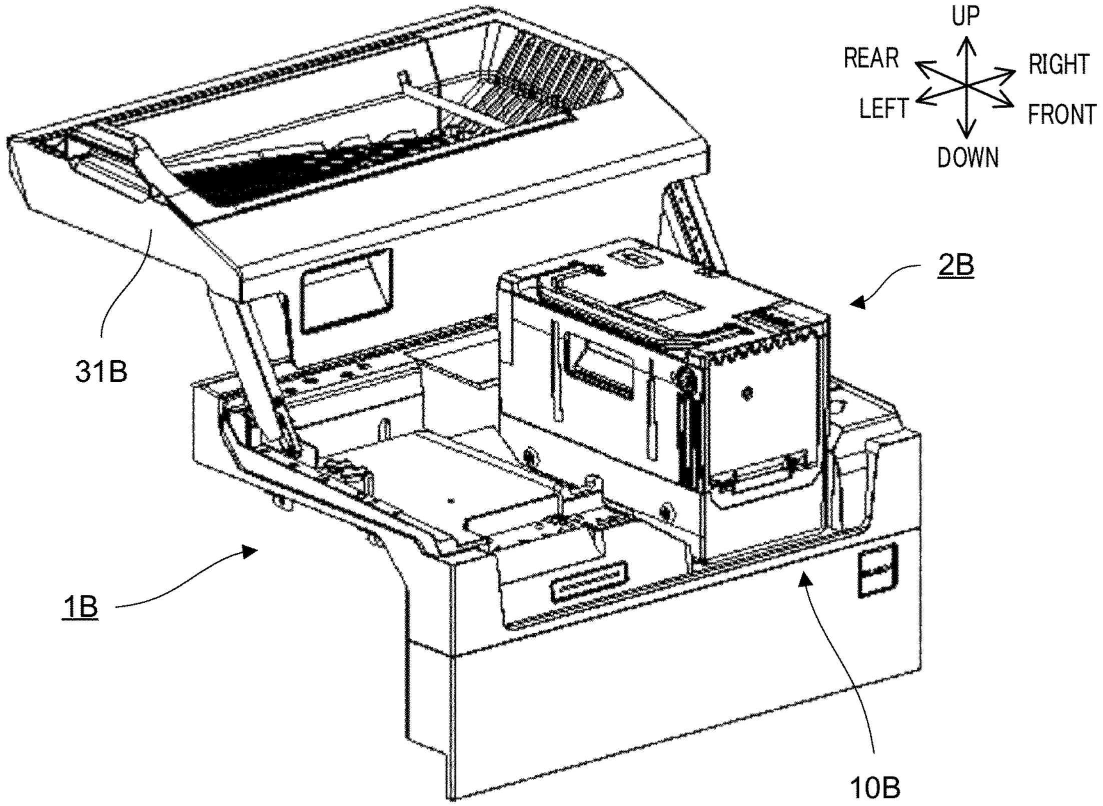
FIG. 6 is a perspective view of the cassette mounting apparatus with the cassette mounted according to Embodiment 3.
Figure 7:
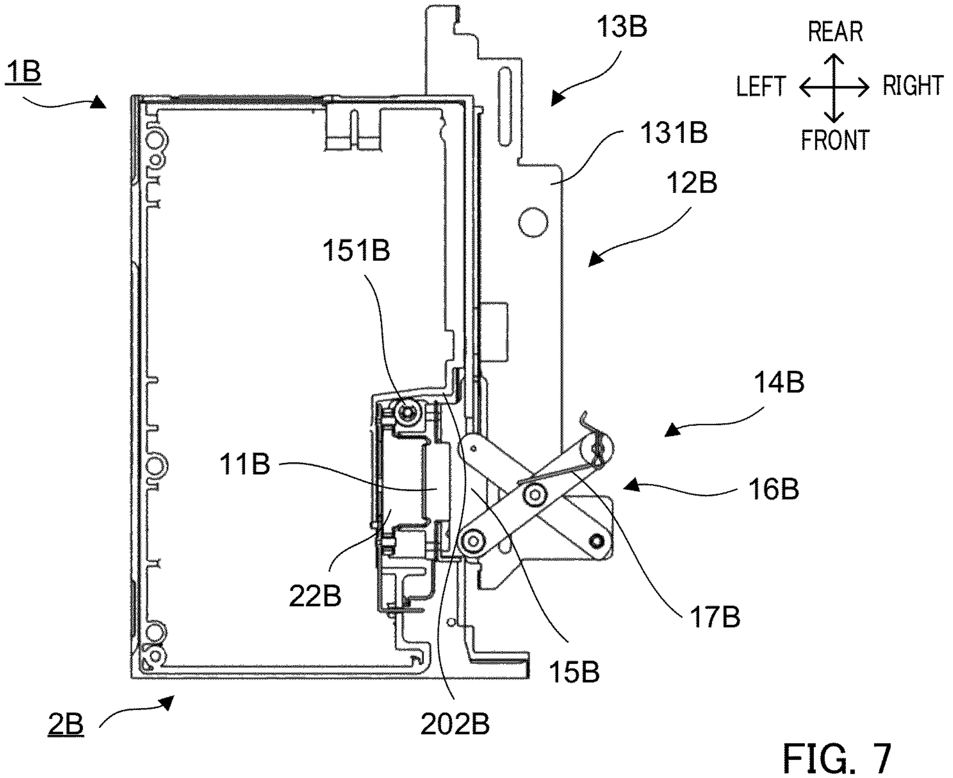
FIG. 7 is a schematic transverse sectional view of the cassette mounting apparatus with the cassette mounted and the cassette according to Embodiment 3.

The configuration of the cassette mounting apparatus is described below. FIG. 4 is a perspective view of the cassette mounting apparatus with no cassette mounted according to Embodiment 3. FIG. 5 is a schematic transverse sectional view of the cassette mounting apparatus with no cassette mounted and the cassette according to Embodiment 3. FIG. 6 is a perspective view of the cassette mounting apparatus with a cassette mounted according to Embodiment 3. FIG. 7 is a schematic transverse sectional view of the cassette mounting apparatus with a cassette mounted and the cassette according to Embodiment 3.

The cassette mounting apparatus 1B illustrated in FIGS. 4 through 7 is provided on the upper and front portion of the main body 30B of the money handling apparatus 3B. The cover 31B is provided so that the cassette mounting apparatus 1B is exposed to the outside as illustrated in FIGS. 4 and 6 when the cover 31B is open, and is hidden as illustrated in FIG. 3A when the cover 31B is closed. The cassette mounting apparatus 1B comprises a cassette mounting section 10B, an apparatus-side connector 11B, and a connection processing section 12B.

The cassette mounting section 10B is formed by a downwardly recessed portion of the main body 30B of the money handling apparatus 3B. The cassette mounting section 10B comprises a main body portion 101B, a right side portion 102B, and a left side portion 103B. The main body portion 101B comprises a placement portion 104B in which the mounted cassette 2B is placed. The right side portion 102B comprises a right facing surface portion 105B that is located to the right of the placement portion 104B and faces the right surface portion of the mounted cassette 2B. A guide rail 106B is provided in the rear region of the right facing surface portion 105B so as to extend in the front-rear direction. A through-hole 107B for a connector is provided in the front region of the right facing surface portion 105B. The left side portion 103B is located to the left of the placement portion 104B. The left side portion 103B comprises a left facing surface portion (not illustrated) that faces the left surface portion of the mounted cassette 2B. The cassette 2B is mounted in the cassette mounting section 10B so that the outlet 21B communicates with the inlet 32B of the money handling apparatus 3B and, thus, the money in the storage area can be fed into the money handling apparatus 3B. The operator fits the guide groove 201B of the cassette 2B onto the guide rail 106B and slides the cassette 2B in the rearward direction. In this manner, the operator can easily perform the mounting operation.

The apparatus-side connector 11B is connected to the cassette-side connector 22B of the cassette 2B. When the apparatus-side connector 11B is connected to the cassette-side connector 22B, electric power is supplied to the power-driven configuration, such as the outlet opening/closing section and the feeding unit. In addition, the money handling apparatus 3B can control the cassette 2B. Furthermore, the money handling apparatus 3B can communicate with the cassette 2B. Examples of communication information include but not limited to the ID of the cassette 2B, the ID of the money handling apparatus 3B, the number of times the cassette 2B has been mounted in the cassette mounting apparatus 1B, information as to whether the money in the cassette 2B requires reconciliation, and information regarding the denominations and the inventory amount of money in the cassette 2B. When the apparatus-side connector 11B is connected to the cassette-side connector 22B, the operation of feeding the money in the cassette 2B into the money handling apparatus 3B is performed.

The connection processing section 12B moves the apparatus-side connector 11B in the left direction in which the apparatus-side connector 11B moves closer to the cassette-side connector 22B, in conjunction with the movement of the cassette 2B when the cassette 2B is mounted in the cassette mounting section 10B. The connection processing section 12B is covered by the right side portion 102B. The connection processing section 12B comprises an interlocking section 13B and a moving section 14B.

The interlocking section 13B moves in conjunction with the movement of the cassette 2B when the cassette 2B is mounted. The interlocking section 13B comprises an interlocking member 131B that can slide freely in the front-rear direction. An extending portion 132B extending to the left is provided at the rear end of the interlocking member 131B so that part of the extending portion 132B is located on the placement portion 104B. A first contact portion 133B in contact with the rear surface portion of the cassette 2B is provided at the front end of the extending portion 132B. Before the cassette is mounted, the extending portion 132B is located on the placement portion 104B, as illustrated in FIGS. 4 and 5. After the cassette is mounted, the extending portion 132B is located behind the placement portion 104B.

The moving section 14B moves the apparatus-side connector 11B in response to the movement of the interlocking section 13B. As illustrated in FIGS. 5 and 7, the moving section 14B comprises a holding member 15B, an extensible section 16B, and a contraction urging section 17B.

The holding member 15B holds the apparatus-side connector 11B by the left region of the holding member 15B. A second contact portion 151B is provided in a region of the holding member 15B located behind the holding position of the apparatus-side connector 11B. The second contact portion 151B is in the form of a bearing, for example. The second contact portion 151B is provided so as to be in contact with the rear surface of the recessed portion 202B of the cassette 2B when the cassette 2B is dismounted from the cassette mounting apparatus 1B.

The extensible section 16B has a pantograph mechanism. The extensible section 16B comprises a first arm 161B and a second arm 162B of the same shape.

A region at one end in the longitudinal direction of the first arm 161B is pivotally connected to the front region of the interlocking member 131B via a first pin 163B. For example, the first pin 163B is inserted to a slit (not illustrated) in the main body portion 101B so as to move along the slit in the front-rear direction. The other end region in the longitudinal direction of the first arm 161B is pivotally connected to the right side region of the holding member 15B via a second pin 164B. The second pin 164B is inserted into a slit 152B of the holding member 15B so as to move along the slit 152B in the front-rear direction.

One end region in the longitudinal direction of the second arm 162B is pivotally connected to a region (not illustrated) of the main body portion 101B via a third pin 165B. The third pin 165B is provided behind the slit having the first pin 163B inserted thereinto so as not to move relative to the main body portion 101B. The other end region in the longitudinal direction of the second arm 162B is pivotally connected to the front right region of the holding member 15B via the fourth pin 166B. A fourth pin 1668 is provided in front of the slit 152B having the second pin 164B inserted thereinto so as not to move relative to the holding member 15B. The midregion of the second arm 162B in the longitudinal direction is pivotally connected to the midregion of the first arm 161B in the longitudinal direction via a fifth pin 167B.

The contraction urging section 17B urges the extensible section 16B to contract the extensible section 16B. The contraction urging section 17B is in the form of a torsion spring, for example. The contraction urging section 17B urges the fifth pin 167B in a counterclockwise direction about the third pin 165B in plan view.

<Operation Performed by Cassette Mounting Apparatus>

The operation performed by the cassette mounting apparatus is described below.

(Operation when Cassette is Mounted)

The operation performed when a cassette is mounted is described first. As illustrated in FIG. 4, the operator opens the cover 31B to expose the cassette mounting apparatus 1B. Thereafter, the operator places the cassette 2B with the inlet and the outlet 21B closed on the placement portion 104B of the cassette mounting section 10B and slides the cassette 2B in the rearward direction. When the first contact portion 133B is pressed by the pressure portion 203B of the cassette 2B in the rearward direction, the interlocking member 131B also moves in the rearward direction. When the interlocking member 131B moves in the rearward direction, the first arm 161B and the second arm 162B pivot against the biasing force of the contraction urging section 17B so that the extensible section 16B extends from the position illustrated in FIG. 5. When the extensible section 16B extends with the cassette 2B and the first contact portion 133B in contact with each other, the apparatus-side connector 11B held by the holding member 15B and the second contact portion 151B move in the rearward direction while moving to the left at the same speed as the cassette 2B. Then, the apparatus-side connector 11B and the second contact portion 151B enter the placement portion 104B through the through-hole 107B for a connector. In addition, when the cassette 2B slides in the rearward direction, the connection between the apparatus-side connector 11B and the cassette-side connector 22B begins. As illustrated in FIGS. 6 and 7, when the apparatus-side connector 11B and the second contact portion 151B move until the rear surface portion of the cassette 2B reaches the rear end of the placement portion 104B, the second contact portion 151B enters the recessed portion 202B, and at the same time connection of the apparatus-side connector 11B with the cassette-side connector 22B is completed. Through the above-described operation, the operation performed when the cassette is mounted is completed. Note that when the connection of the apparatus-side connector 11B with the cassette-side connector 22B is completed, a locking mechanism may be activated to fix the cassette 2B to the cassette mounting apparatus 1B.

(Operation Performed when Cassette is Dismounted)

The operation performed when a cassette is dismounted is described below. The operator slides the cassette 2B illustrated in FIGS. 6 and 7 in the frontward direction. When the cassette 2B is slid in the frontward direction, the second contact portion 151B is pressed in the frontward direction by the rear surface of the recessed portion 202B and, thus, the fourth pin 166B is pressed in the frontward direction. The pressure of the fourth pin 166B in the frontward direction and the biasing force of the contraction urging section 17B pivot the first arm 161B and the second arm 162B so that the extensible section 16B contracts from the position illustrated in FIG. 7. When the extensible section 16B contracts, the apparatus-side connector 11B moves in the frontward direction at the same speed as the cassette 2B while moving to the right. Thus, connection between the apparatus-side connector 11B and the cassette-side connector 22B is disconnected. In addition, when the cassette 2B slides in the frontward direction, the apparatus-side connector 11B and the second contact portion 151B enter the right side portion 102B through the through-hole 107B for a connector and enter the mode illustrated in FIG. 5, and the cassette 2B is dismounted. Furthermore, the holding member 15B also returns to the mode illustrated in FIG. 5. Through the above-described operation, the operation performed when a cassette is dismounted is completed.

Effects of Embodiment 3

The cassette mounting apparatus 1B comprises the connection processing section 12B that moves the apparatus-side connector 11B and connects the apparatus-side connector 11B to the cassette-side connector 22B. As a result, through the operation the same as that of the cassette mounting apparatus 1 according to Embodiment 1, the cassette 2B can be mounted in the cassette mounting apparatus 1B while preventing damage to at least one of the cassette-side connector 22B and the apparatus-side connector 11B.

The cassette mounting apparatus 1B and the cassette 2B are configured so that the movement direction of the cassette 2B when the cassette 2B is mounted in the cassette mounting section 10B and the movement direction of the apparatus-side connector 11B when the apparatus-side connector 11B is connected to the cassette-side connector 22B cross each other. As a result, it is no necessary to provide the cassette-side connector 22B at the front of the mounting direction in the cassette 2B.

The connection processing section 12B of the cassette mounting apparatus 1B moves the apparatus-side connector 11B and connects the apparatus-side connector 11B to the cassette-side connector 22B in conjunction with the movement of the cassette 2B when the cassette 2B is mounted in the cassette mounting section 10. As a result, mounting the cassette 2B and connecting the apparatus-side connector 11B to the cassette-side connector 22B can be completed simultaneously.

The interlocking member 131B of the interlocking section 13B comprises the first contact portion 133B. The interlocking member 131B is configured to move in conjunction with the movement of the cassette 2B when the cassette 2B is mounted by maintaining contact of the first contact portion 133B with the cassette 2B. As a result, the configuration can be simplified as compared with the configuration that links the interlocking member 131B with the movement of the cassette 2 on the basis of the detection result of the movement of the cassette 2B by a detection section.

The moving section 14B moves the apparatus-side connector 11B in a direction closer to the cassette-side connector 22B by extending the extensible section 16B. As a result, the range of movement of the configuration for moving the apparatus-side connector 11B can be reduced as compared with the case where the extensible configuration is not used and, thus, the size of the cassette mounting apparatus 1B can be easily reduced.

The moving section 14B comprises the contraction urging section 17B that urges the extensible section 16B to contract the extensible section 16B. As a result, when the cassette 2B is dismounted from the cassette mounting apparatus 1B, the extensible section 16B can be contracted smoothly.

The rear surface of the recessed portion 202B is inclined so that the right side is located more rearward than the left side. For this reason, when the cassette is mounted, the second contact portion 151B easily enter the recessed portion 202B. In addition, the rear surface of the recessed portion 202B operates to press the second contact portion 151B to the right when the cassette is dismounted. As a result, the extensible section 16B easily contract, and in turn, the apparatus-side connector 11B easily comes out of the recessed portion 202B.

Embodiment 4

Embodiment 4 according to the present disclosure is described below.

<Configuration of Cassette Mounting Apparatus>

Figure 8:
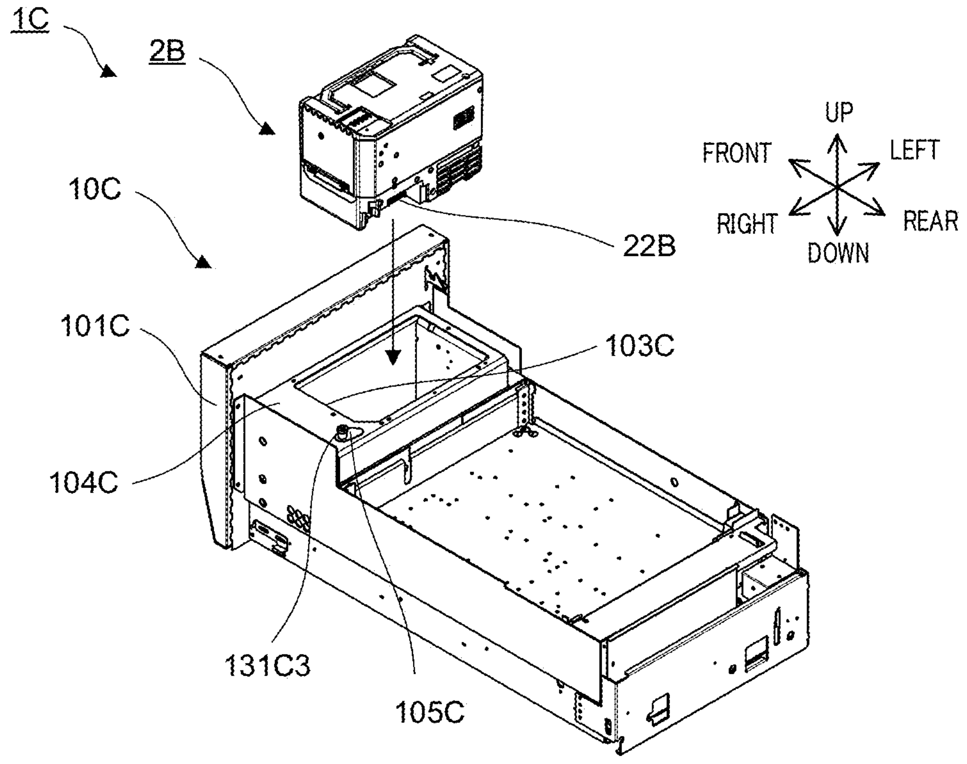
FIG. 8 is a perspective view of a cassette mounting apparatus according to Embodiment 4.
Figure 9:
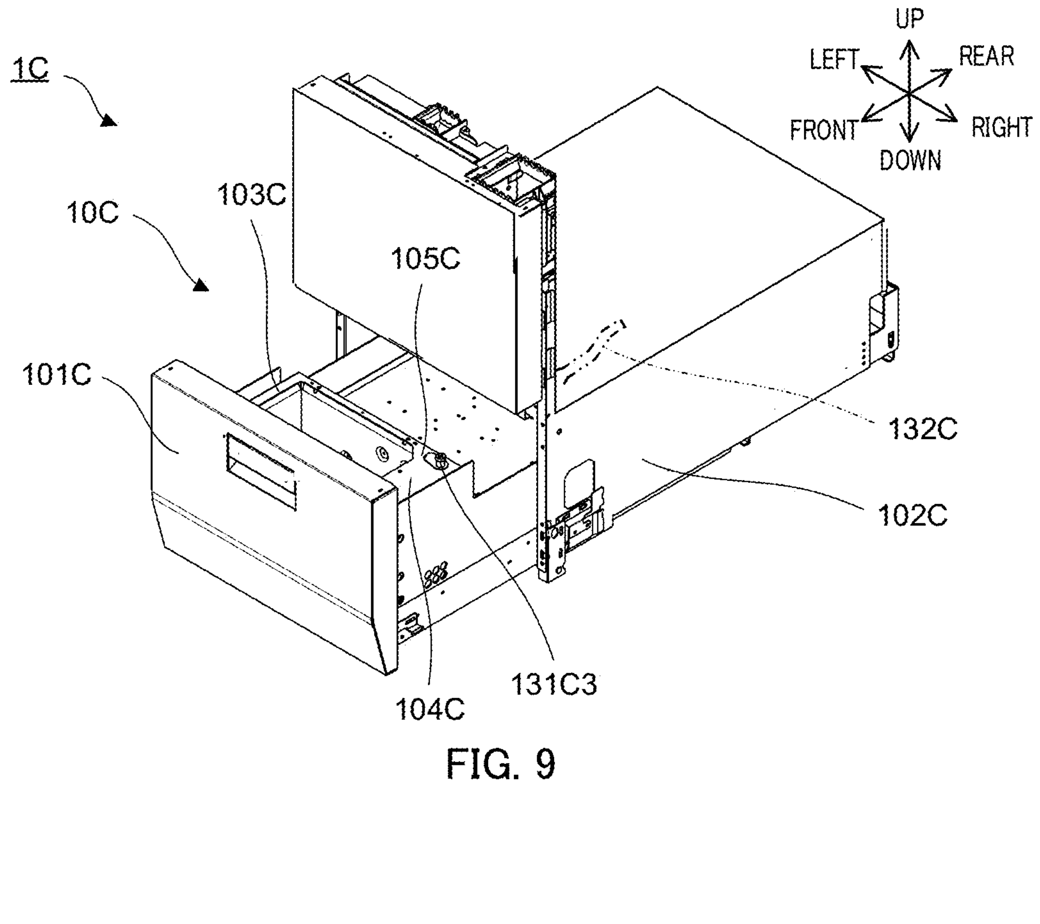
FIG. 9 is a perspective view of the cassette mounting apparatus according to the Embodiment 4.
Figure 10:
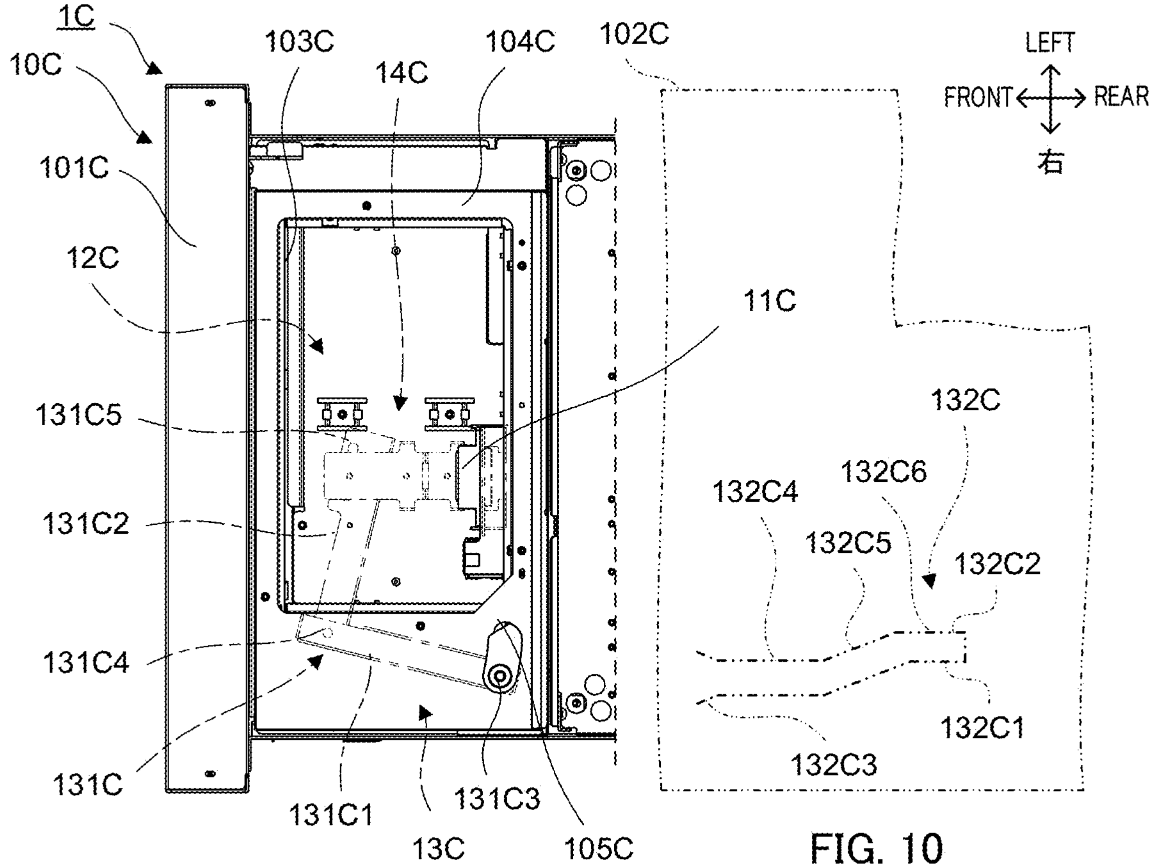
FIG. 10 is a plan view of the cassette mounting apparatus according to Embodiment 4.
Figure 11:
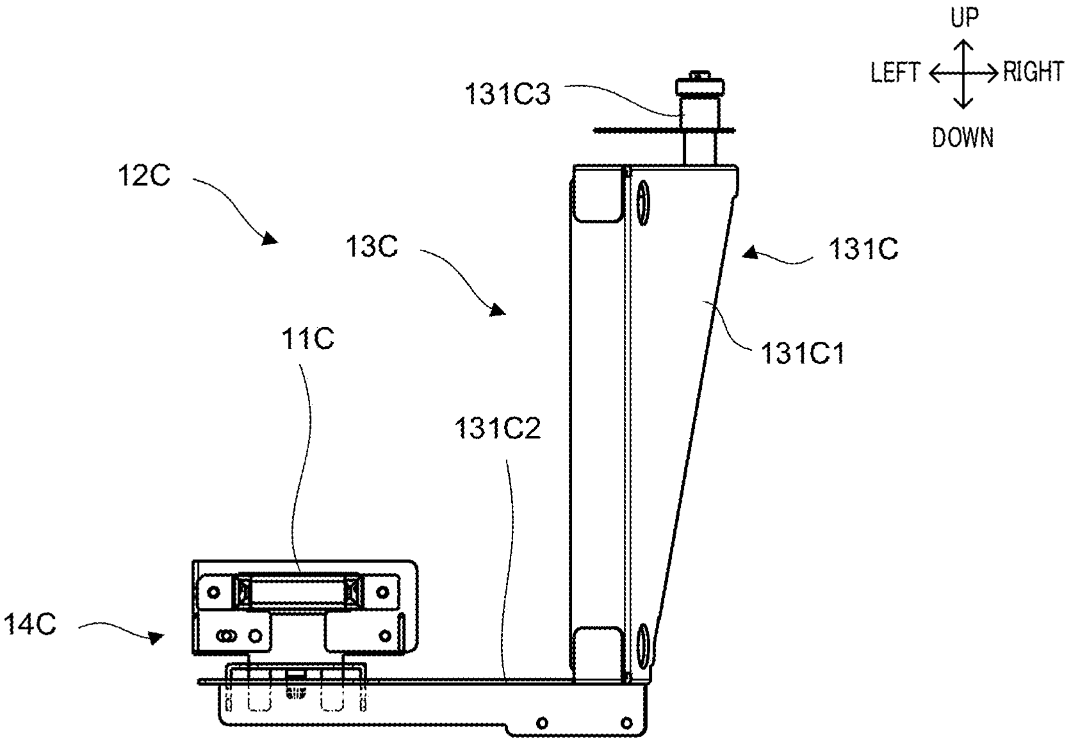
FIG. 11 is a front view of a connection processing section according to Embodiment 4.
Figure 12:
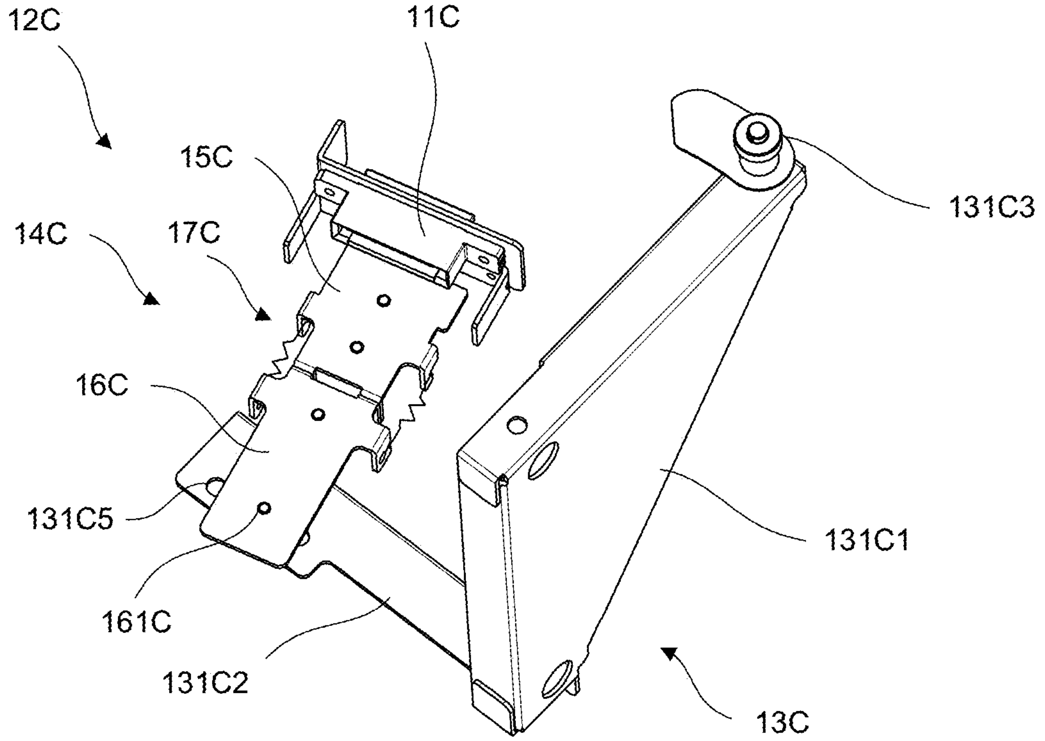
FIG. 12 is a perspective view of the connection processing section according to Embodiment 4.
Figure 13:
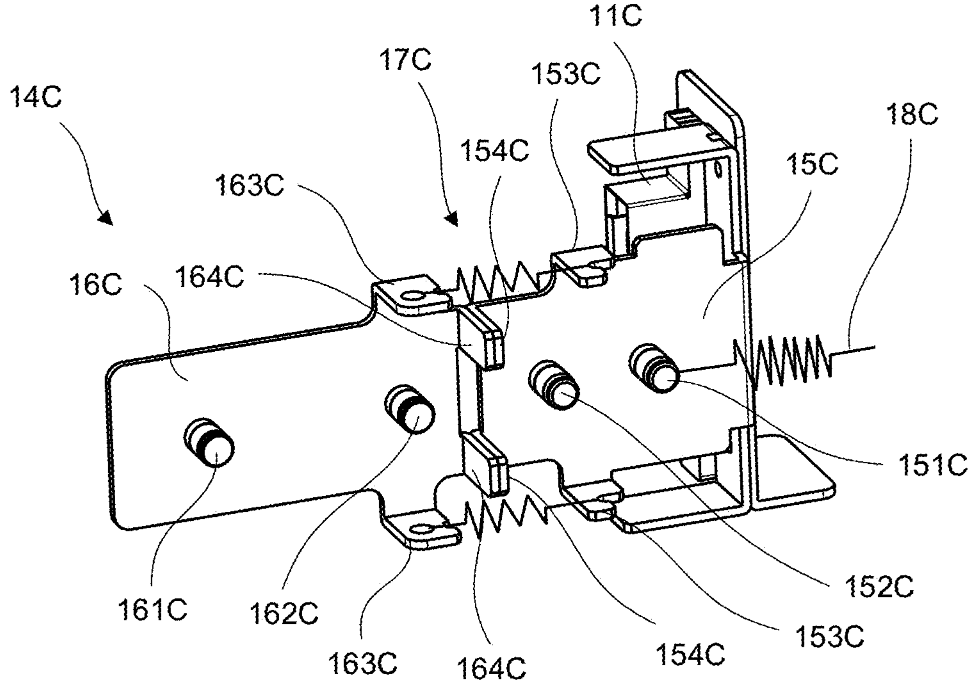
FIG. 13 is a view of a moving section viewed from below according to Embodiment 4.

The configuration of a cassette mounting apparatus is described first. FIG. 8 is a perspective view of the cassette mounting apparatus according to Embodiment 4. FIG. 9 is a perspective view of the cassette mounting apparatus according to Embodiment 4. FIG. 10 is a plan view of the cassette mounting apparatus according to Embodiment 4. FIG. 11 is a front view of a connection processing section according to Embodiment 4. FIG. 12 is a perspective view of a connection processing section according to Embodiment 4. FIG. 13 is a view of a moving section according to Embodiment 4, as viewed from below.

The cassette mounting apparatus 1C illustrated in FIGS. 8 and 9 is provided in the lower region of the main body 30B of a money handling apparatus 3C illustrated in FIGS. 3A and 3B. The money handling apparatus 3C according to Embodiment 4 has a money dispensing function to discharge the money stored in the storage unit of the money handling apparatus 3C into the cassette 2B mounted in the cassette mounting apparatus 1C. The cassette mounting apparatus 1C comprises a cassette mounting section 10C, an apparatus-side connector 11C, and a connection processing section 12C.

The cassette mounting section 10C comprises a cassette container 101C and a container insertion section 102C. As illustrated in FIGS. 8 to 10, the cassette container 101C comprises a plate-shaped upper surface member 104C having an opening 103C used to store the cassette 2B. A slit 105C is provided in the rear and right region of the upper surface member 104C to enable a roller 131C3 (described below) to protrude from the upper surface member 104C. The slit 105C is formed to have a shape that enables the roller 131C3 to move in the right-left direction. The cassette 2B is stored in the cassette container 101C with the cassette-side connector 22B facing the rearward direction. The direction in which the cassette 2B is stored into the cassette container 101C is the downward direction. The cassette container 101C is inserted into the container insertion section 102C and, thus, the cassette 2B is mounted. The direction in which the cassette container 101C is inserted into the container insertion section 102C is the rearward direction.

The apparatus-side connector 11C is connected to the cassette-side connector 22B of the cassette 2B. After the apparatus-side connector 11C is connected to the cassette-side connector 22B, the money handling apparatus 3C can control the cassette 2B, as in the case where the apparatus-side connector 11C of the cassette mounting apparatus 1B is connected to the cassette-side connector 22B. In addition, communication between the money handling apparatus 3C and the cassette 2B is available. After the apparatus-side connector 11C is connected to the cassette-side connector 22B of the cassette 2B, the money in the money handling apparatus 3C is dispensed into the cassette 2B.

The connection processing section 12C moves the apparatus-side connector 11C in the frontward direction in conjunction with the movement of the cassette 2B when the cassette 2B is mounted in the cassette mounting section 10C so that the apparatus-side connector 11C moves closer to the cassette-side connector 22B. As illustrated in FIGS. 10 to 12, the connection processing section 12C comprises an interlocking section 13C and a moving section 14C.

The interlocking section 13C moves in conjunction with the movement of the cassette 2B that is being mounted. The interlocking section 13C comprises an interlocking member 131C and an interlocking control section 132C.

The interlocking member 131C comprises a vertical member 131C1 and a horizontal member 131C2. The vertical member 131C1 comprises a right-angled triangular plate-shaped side portion having a surface substantially parallel to the vertical direction. The side portion is configured so that the right-angled corner is the front and upper corner. A rectangular plate-shaped upper surface portion having a surface substantially parallel to the horizontal direction is provided at the upper end of the side portion. A roller 131C3 that rotates about an axis extending in the vertical direction is provided in the rear region of the upper surface portion. In the front region of the vertical member 131C1, a pivot shaft 131C4 extending in the vertical direction is provided. The interlocking member 131C is disposed in the cassette container 101C so that the roller 131C3 protrudes from the slit 105C of the cassette container 101C and pivots about the pivot shaft 131C4. The horizontal member 131C2 is provided so as to extend from the lower end of the front side of the vertical member 131C1 to the left. The horizontal member 131C2 is formed to comprise a rectangular plate-shaped region having a surface substantially parallel to the horizontal direction. A slit 131C5 extending in the right-left directions is provided in the left region of the horizontal member 131C2.

The interlocking control section 132C moves the interlocking member 131C in conjunction with the movement of the cassette container 101C. The interlocking control section 132C is provided in the region of the container insertion section 102C facing the upper portion of the cassette container 101C. The interlocking control section 132C regulates the movement of the roller 131C3 of the interlocking member 131C in the right-left direction when the cassette container 101C is inserted into the container insertion section 102C. As illustrated in FIG. 10, the interlocking control section 132C comprises the right side portion 132C1 and a left side portion 132C2 facing each other. The right side portion 132C1 and the left side portion 132C2 can be composed of plate-like members hanging vertically from a ceiling plate of the container insertion section 102C. A space is formed between the right side portion 132C1 and the left side portion 132C2 to enable the roller 131C3 of the interlocking member 131C to pass therethrough. Note that the interlocking control section 132C may be in the form of a slit.

The interlocking control section 132C comprises a roller receiving portion 132C3, a first rectilinear guide portion 132C4, and an oblique guide portion 132C5, and a second rectilinear guide portion 132C6. The roller receiving portion 132C3 is formed so that its width (the length in the right-left direction) increases frontward. By using the roller receiving portion 132C3 having such a shape, the roller 131C3 can easily enter the interlocking control section 132C. The first rectilinear guide portion 132C4 is provided at the rear end of the roller receiving portion 132C3 so as to guide the roller 131C3 in the front-rear direction. The oblique guide portion 132C5 is provided at the rear end of the first rectilinear guide portion 132C4 so as to guide the roller 131C3 in the diagonally rearward left direction or the diagonally forward right direction. The second rectilinear guide portion 132C6 is provided at the rear end of the oblique guide portion 132C5 so as to guide the roller 131C3 in the front-rear direction.

The moving section 14C moves the apparatus-side connector 11C in accordance with the movement of the interlocking section 13C. As illustrated in FIGS. 12 and 13, the moving section 14C comprises a holding member 15C, a moving member 16C, an elastic section 17C, and an urging section 18C.

The holding member 15C is in the form of a plate having a surface direction substantially parallel to the horizontal direction. The holding member 15C holds the apparatus-side connector 11C by the rear region of the holding member 15C. The holding member 15C holds the apparatus-side connector 11C so that the movement direction of the apparatus-side connector 11C that is being connected to the cassette-side connector 22B is the frontward direction. A first pin 151C protruding downward is provided in the rear midregion of the holding member 15C in the right-left direction. A second pin 152C is provided in front of the first pin 151C. A pair of downward protruding hook portions 153C is provided at the right and left edges of the holding member 15C. A pair of downward protruding movement regulating tip portions 154C is provided at the right and left ends of the front edge of the holding member 15C.

The moving member 16C is in the form of a plate having a surface substantially parallel to the horizontal direction. A downward protruding first pin 161C is provided at the front midregion of the moving member 16C in the right-left direction. A second pin 162C is provided behind the first pin 161C. A pair of downward protruding hook portions 163C are provided at both the right and left edges of the moving member 16C. A pair of downward protruding movement regulating tip portions 164C are provided at both the right and left ends of the rear edge of the moving member 16C.

The elastic section 17C separably connects the holding member 15C to the moving member 16C. The elastic section 17C is composed of a pair of coil springs. One end of each of the coil springs is hooked on the hook portion 153C of the holding member 15C, and the other end is hooked on the hook portion 163C of the moving member 16C. Each of the coil springs urges the holding member 15C and the moving member 16C to move closer to each other. Note that the holding member 15C and the moving member 16C may be integrated into one member, and a configuration without the elastic section 17C may be employed.

The urging section 18C is in the form of a coil spring, for example. The urging section 18C is configured to urge the holding member 15C in the insertion direction in which the holding member 15C is inserted into the cassette container 101C by using a force that is less than the elastic force of the elastic section 17C and is greater than the connection force, which is the force to maintain the connection between the cassette-side connector 22B and the apparatus-side connector 11C. Note that the urging section 18C does not have to be provided.

The moving section 14C having the above-described configuration is provided below the position at which the cassette 2B is stored in the cassette container 101C. The holding member 15C is provided in a movable manner in the insertion direction of the cassette container 101C (the rearward direction). The moving member 16C is provided on the removal direction side of the holding member 15C (the removal direction is the direction in which the cassette container 101C is removed, that is, the frontward direction). The movement direction of the holding member 15C and the moving member 16C is regulated to only the front-rear direction by a guide section (not illustrated). The moving member 16C is provided so that the first pin 161C is inserted into the slit 131C5 of the interlocking member 131C from above. One end of the urging section 18C is hooked on a hook portion (not illustrated) of the cassette container 101C, and the other end is hooked on the first pin 151C of the holding member 15C. The urging section 18C urges the holding member 15C in the insertion direction of the cassette container 101C.

<Operation Performed by Cassette Mounting Apparatus>

Figure 14:
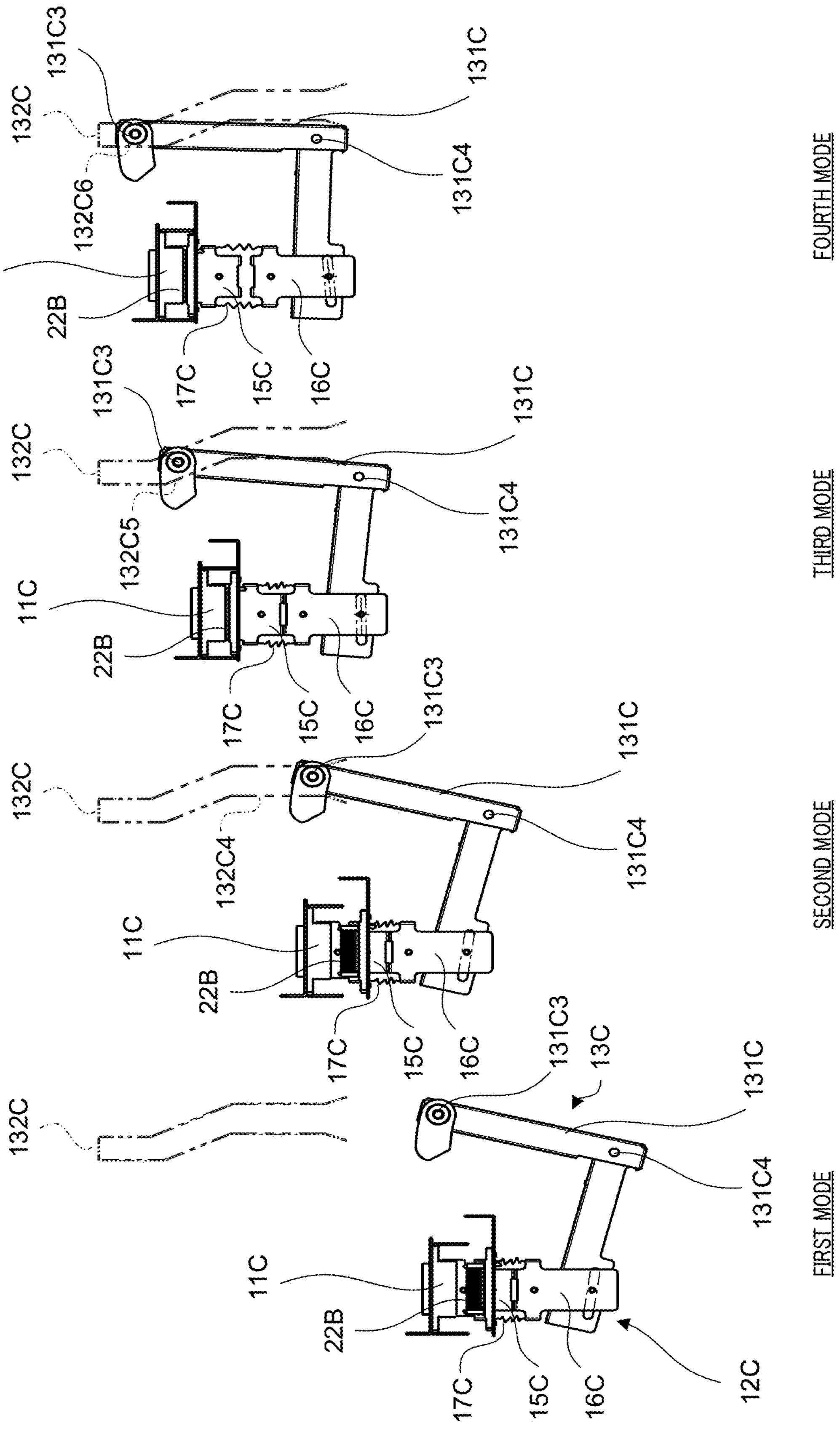
FIG. 14 illustrates the operation performed by the cassette mounting apparatus according to Embodiment 4.

The operation performed by the cassette mounting apparatus is described below. FIG. 14 illustrates the operation performed by the cassette mounting apparatus according to Embodiment 4.

(Operation when Cassette is Mounted)

The operation when a cassette is mounted is described first. As illustrated in FIG. 9, the operator pulls out the cassette container 101C from the container insertion section 102C. When the cassette container 101C is pulled out from the container insertion section 102C, the connection processing section 12C enters a first mode illustrated in the leftmost section of FIG. 14. In the first mode, the roller 131C3 of the interlocking member 131C is not in the interlocking control section 132C. The holding member 15C and the moving member 16C are urged by the elastic section 17C so as to move closer to each other by the elastic section 17C, and a movement regulating tip portion 154C and the movement regulating tip portion 164C are in contact with each other. As illustrated in FIG. 8, the operator stores, in the cassette container 101C, the cassette 2B having the closed inlet and the closed outlet 21B through the opening 103C. When the cassette 2B is stored in the cassette container 101C, the cassette-side connector 22B faces the apparatus-side connector 11C without connection therebetween.

The operator pushes the cassette container 101C and inserts the cassette container 101C into the container insertion section 102C. At this time, the connection processing section 12C enters a second mode illustrated in the second section from the left in FIG. 14. In the second mode, the roller 131C3 passes through the roller receiving portion 132C3 of the interlocking control section 132C and enters the first rectilinear guide portion 132C4. When the roller 131C3 passes through the roller receiving portion 132C3 and the first rectilinear guide portion 132C4, the position of the roller 131C3 in the right-left direction does not change from that in the first mode. For this reason, the interlocking member 131C remains in the first mode and does not pivot.

When the cassette container 101C is further inserted from the position in the second mode, the connection processing section 12C enters a third mode illustrated in the second section from the right in FIG. 14. In the third mode, the roller 131C3 enters the oblique guide portion 132C5 of the interlocking control section 132C. When the roller 131C3 passes through the oblique guide portion 132C5, the roller 131C3 moves to the left than in the second mode. This movement of the roller 131C3 to the left causes the interlocking member 131C to pivot about the pivot shaft 131C4 counterclockwise in plan view. This counterclockwise rotation of the interlocking member 131C causes the moving member 16C to move in the frontward direction relative to the cassette container 101C. At this time, the holding member 15C moves forward relative to the cassette container 101C due to the urging force of the elastic section 17C while being in contact with the moving member 16C. The relative forward movement of the holding member 15C causes the apparatus-side connector 11C to be connected to the cassette-side connector 22B.

When the cassette container 101C is further inserted from the position in the third mode, the roller 131C3 further moves to the left from the position in the third mode, and the interlocking member 131C further pivots counterclockwise. This counterclockwise pivot of the interlocking member 131C causes the moving member 16C to move in the frontward direction relative to the cassette container 101C. At this time, since the apparatus-side connector 11C is connected to the cassette-side connector 22B, the holding member 15C cannot move in the frontward direction relative to the cassette container 101C. However, the moving member 16C is connected to the holding member 15C via the elastic section 17C. For this reason, the elastic section 17C extends and, thus, the moving member 16C is separated from the holding member 15C and moves in the frontward direction relative to the cassette container 101C (refer to a fourth mode illustrated in the rightmost section of FIG. 14).

That is, even when the cassette container 101C (that is, the cassette 2B) is further moved rearward after the apparatus-side connector 11C is connected to the cassette-side connector 22B, the elastic section 17C extends and, thus, the moving member 16C is separated from the holding member 15C. In this way, it is possible to prevent the apparatus-side connector 11C from being strongly pressed against the cassette-side connector 22B, which in turn prevents damage to the apparatus-side connector 11C and the cassette-side connector 22B. In addition, the timing at which the counterclockwise pivot of the interlocking member 131C ends (the timing at which the roller 131C3 reaches the boundary between the oblique guide portion 132C5 and the second rectilinear guide portion 132C6) and the timing at which the connection of the apparatus-side connector 11C to the cassette-side connector 22B ends need not be strictly the same. In this way, the management of the manufacturing processes of the cassette mounting apparatus 1C is facilitated.

When the cassette container 101C is further inserted to complete the insertion, the connection processing section 12C enters the fourth mode illustrated in the rightmost section of FIG. 14. In the fourth mode, the roller 131C3 passes through the oblique guide portion 132C5 of the interlocking control section 132C and enters the second rectilinear guide portion 132C6. When the roller 131C3 passes through the second rectilinear guide portion 132C6, the position of the roller 131C3 in the right-left direction does not change and, thus, the interlocking member 131C remains its position at the time the roller 131C3 passes through the oblique guide portion 132C5 and does not pivot. Through the above-described operations, the operation for mounting the cassette is completed.

(Operation when Cassette is Dismounted)

The operation performed when the cassette is dismounted is described below. The operator pulls out the cassette container 101C in the frontward direction from the container insertion section 102C. When the cassette container 101C is moved in the frontward direction, the mode of the connection processing section 12C is changed from the fourth mode to the first mode via the third mode and the second mode and, thus, the connection between the apparatus-side connector 11C and the cassette-side connector 22B is disconnected. Since the urging force of the urging section 18C is set to be greater than the connection force between the cassette-side connector 22B and the apparatus-side connector 11C, the holding member 15C is pulled rearward by the urging section 18C when transition from the third mode to the second mode occurs. As a result, the disconnection of the apparatus-side connector 11C from the cassette-side connector 22B can be smoothly performed.

When the connection processing section 12C enters the first mode, the operator dismounts the cassette 2B from the cassette container 101C and inserts the cassette container 101C into the container insertion section 102C. Through the above-described operations, the operations for dismounting a cassette is completed.

Effects of Embodiment 4

The cassette mounting apparatus 1C comprises the connection processing section 12C that moves the apparatus-side connector 11C and connects the apparatus-side connector 11C to the cassette-side connector 22B. For this reason, it is prevented that the force with which the operator presses the cassette container 101C, that is, the force with which the operator moves the cassette 2B, is directly exerted on the cassette-side connector 22B and the apparatus-side connector 11C. As a result, the cassette 2B can be mounted in the cassette mounting apparatus 1C while preventing damage to at least one of the cassette-side connector 22B and the apparatus-side connector 11C.

The connection processing section 12C of the cassette mounting apparatus 1C moves the apparatus-side connector 11C and connects the apparatus-side connector 11C to the cassette-side connector 22B in conjunction with the movement of the cassette 2B when the cassette 2B is mounted in the cassette mounting section 10C. As a result, the time required for mounting the cassette 2B and connecting the apparatus-side connector 11C to the cassette-side connector 22B can be reduced.

The interlocking section 13C is configured to move in conjunction with the movement of the cassette container 101C when the cassette container 101C is inserted into the container insertion section 102C, without being brought into contact with the cassette 2B. As a result, damage to the cassette 2B caused by direct contact of the interlocking section 13C with the cassette 2B can be prevented.

Modifications of Embodiments

It should be appreciated that the present disclosure is not limited to the embodiments above, and various modifications can be made without departing from the scope and sprit of the present disclosure. The above embodiments and the modifications described below may be combined in any way within the applicable range.

Figure 15:
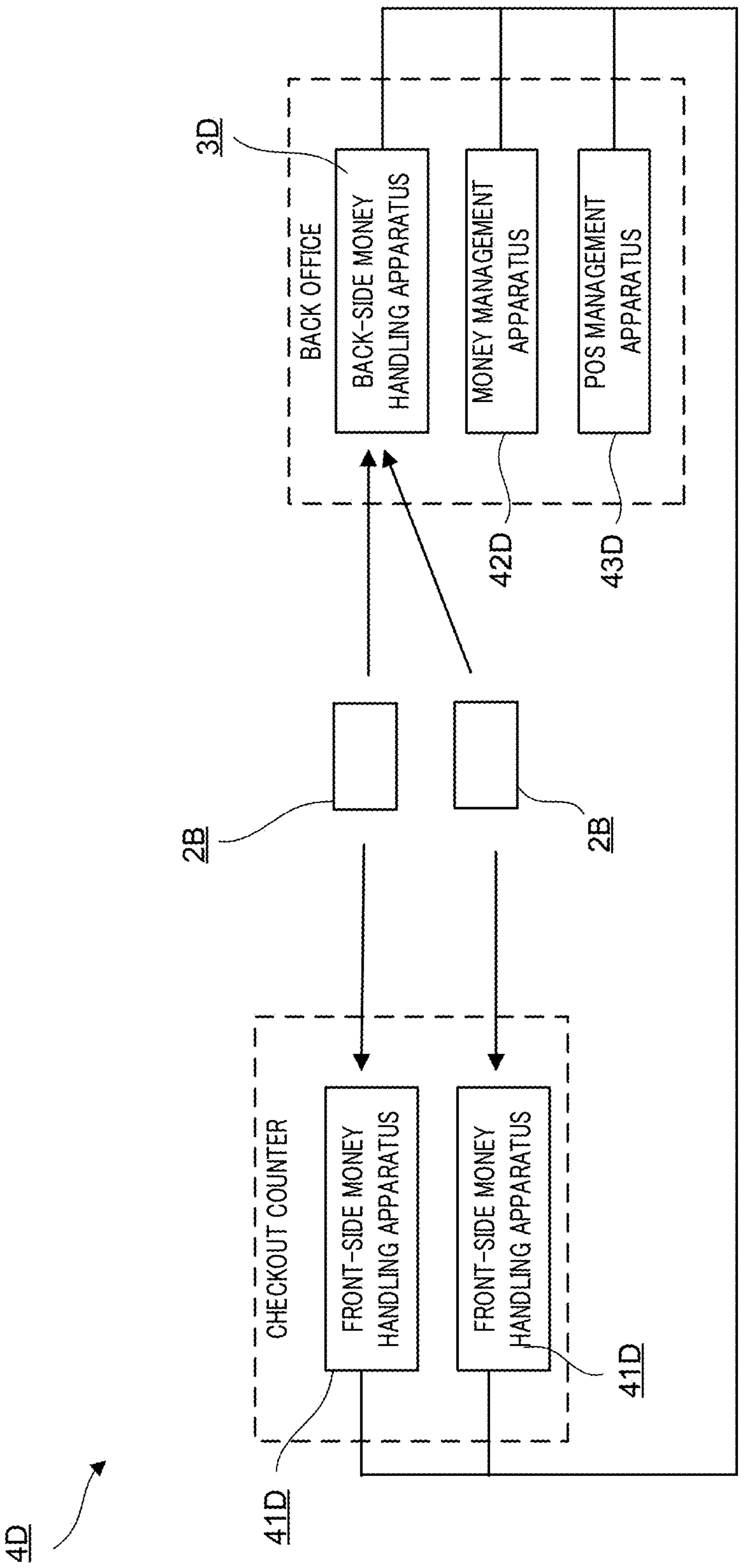
FIG. 15 is a block diagram of a money handling system according to a modification.

The cassette mounting apparatus according to the present disclosure may be applied to a money handling system 4D illustrated in FIG. 15. The money handling system 4D is a system for distribution and is installed in a store. The money handling system 4D comprises one back-side money handling apparatus 3D, two front-side money handling apparatuses 41D, two cassettes 2B, one money management apparatus 42D, and one POS management apparatus 43D. Note that the money handling system 4D may comprise only one front-side money handling apparatus 41D or more than three front-side money handling apparatuses 41D.

The front-side money handling apparatus 41D is installed at a checkout counter, which is an example of a front office of the store. The front-side money handling apparatus 41D is operated by a store staff or a customer themselves and is used for the settlement process between the store staff and the customer. The front-side money handling apparatus 41D takes in the money paid by the customer or dispenses the change to be paid to the customer. The front-side money handling apparatus 41D comprises a cassette mounting apparatus in which the cassette 2B is to be mounted. The front-side money handling apparatus 41D takes in, from the cassette 2B, the change fund in the back-side money handling apparatus 3D and delivers the proceeds from sales into the cassette 2B. The front-side money handling apparatus 41D is communicably connected to a POS register (not illustrated) operated by a store staff or a self-checkout register (not illustrated) operated by a customer.

The back-side money handling apparatus 3D, the money management apparatus 42D, and the POS management apparatus 43D are installed in the back office of the store. The back-side money handling apparatus 3D is communicably connected to each of the front-side money handling apparatuses 41D. The back-side money handling apparatus 3D comprises a cassette mounting apparatus in which the cassette 2B is to be mounted. The back-side money handling apparatus 3D dispenses, into the cassette 2B, the change fund to be stored in the front-side money handling apparatuses 41D or takes in, from the cassette 2B, the proceeds from sales collected from the front-side money handling apparatuses 41D.

The money management apparatus 42D is connected to each of the front-side money handling apparatuses 41D and the back-side money handling apparatus 3D via a local area network (LAN) or the like. The money management apparatus 42D manages the money stored in each of the front-side money handling apparatuses 41D and the back-side money handling apparatus 3D. For example, the money management apparatus 42D manages the money settled in each of the front-side money handling apparatuses 41D and the money transferred between the front-side money handling apparatus 41D and the back-side money handling apparatus 3D. The POS management apparatus 43D manages the goods flow.

In the money handling system 4D described above, at least one of the cassette mounting apparatus 1B according to Embodiment 3 and the cassette mounting apparatus 1C according to Embodiment 4 may be provided in the back-side money handling apparatus 3D. For example, the cassette mounting apparatus 1B according to Embodiment 3 may be applied as the first cassette mounting apparatus. As the second cassette mounting apparatus, the cassette mounting apparatus 1C according to Embodiment 4 may be applied. Alternatively, the same configuration as the cassette mounting apparatus 1C according to Embodiment 4 may be applied as the first cassette mounting apparatus, and the same configuration as the cassette mounting apparatus 1B according to Embodiment 3 may be applied as the second cassette mounting apparatus. The first cassette mounting apparatus and the second cassette mounting apparatus may be a cassette mounting apparatus for deposit in which the cassette 2B is mounted when the proceeds from sales are collected or a cassette mounting apparatus for withdrawal in which the cassette 2B is mounted when the change fund is dispensed.

For example, the cassette mounting apparatus 1B according to Embodiment 3 can be applied as the cassette mounting apparatus for deposit (the first cassette mounting apparatus) of the back-side money handling apparatus 3D, and the cassette mounting apparatus 1C according to Embodiment 4 can be applied as the cassette mounting apparatus for withdrawal (the second cassette mounting apparatus). In this case, the orientation of the cassette 2B relative to the cassette mounting apparatus 1B when the cassette 2B is mounted in the cassette mounting apparatus 1B (the orientation in which the rear surface portion faces rearward) differs from the orientation of the cassette 2B relative to the cassette mounting apparatus 1C when the cassette 2B is mounted in the cassette mounting apparatus 1C (the orientation in which the right surface portion faces rearward). Note that in this case, a cassette mounting apparatus that does not comprise a connection processing section may be applied as a cassette mounting apparatus for deposit or withdrawal.

Only one of the cassette mounting apparatus 1B according to Embodiment 3 and the cassette mounting apparatus 1C according to Embodiment 4 may be provided in the back-side money handling apparatus 3D. The proceeds from sales in the cassette 2B mounted in the cassette mounting apparatus can be collected, and the change fund can be dispensed into the cassette 2B.

Two back-side money handling apparatuses 3D may be provided in the money handling system 4D, and one of the back-side money handling apparatuses 3D (the first money handling apparatus) may be used exclusively for collecting the proceeds from sales, and the other (the second money handling apparatus) may be used exclusively for dispensing the change fund. In this case, a configuration the same as the cassette mounting apparatus 1B according to Embodiment 3 or the cassette mounting apparatus 1C according to Embodiment 4 may be applied as the cassette mounting apparatuses of the two back-side money handling apparatuses 3D. Note that a configuration the same as the cassette mounting apparatus 1B according to Embodiment 3 or the cassette mounting apparatus 1C according to Embodiment 4 may be applied to three or more back-side money handling apparatuses 3D.

Figure 16:
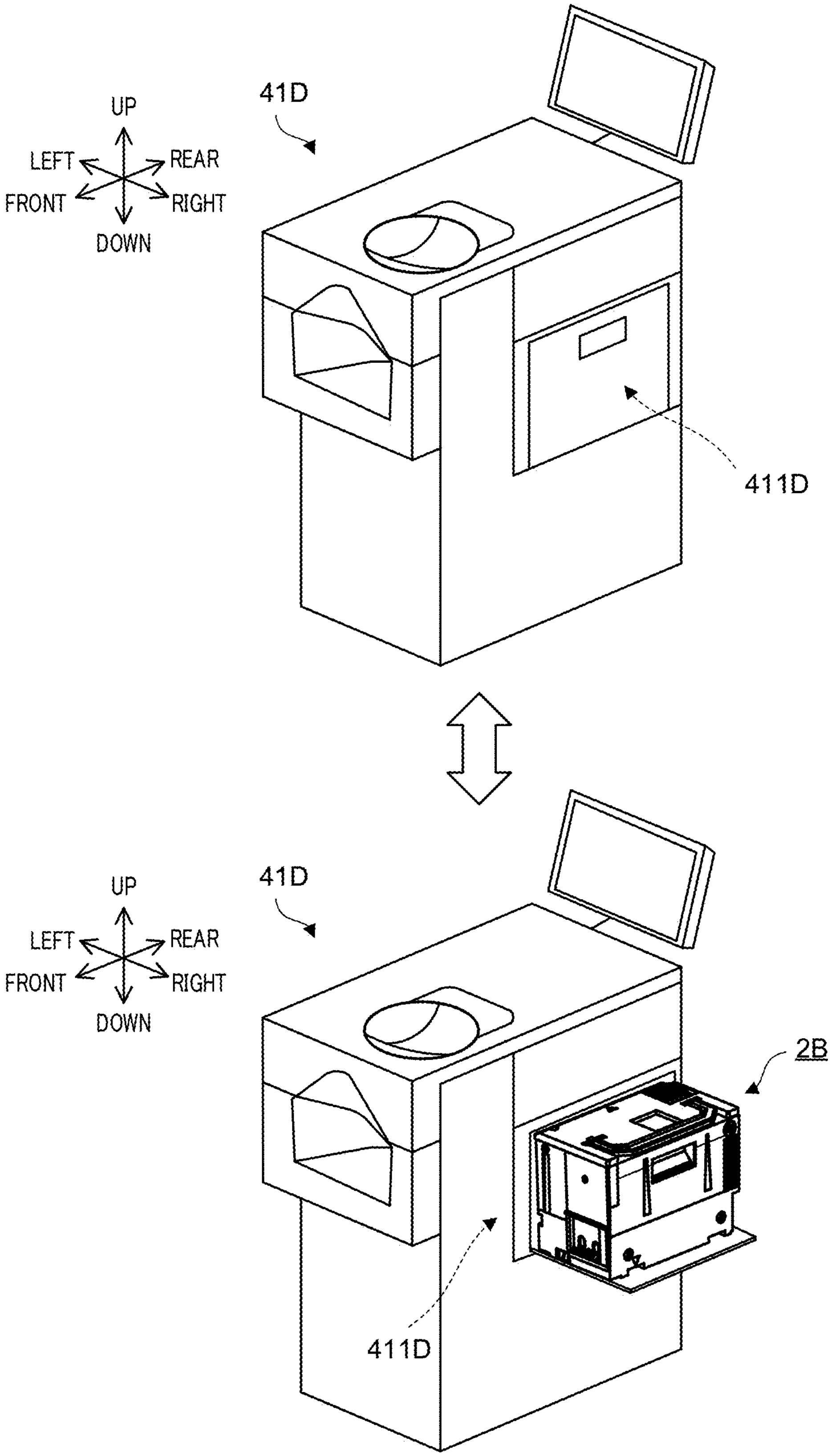
FIG. 16 is a perspective view of a second money handling apparatus according to the modification.

When the configuration illustrated in FIG. 16 is applied as the front-side money handling apparatuses 41D (the first money handling apparatus), a configuration the same as the cassette mounting apparatus 1B according to Embodiment 3 or the cassette mounting apparatus 1C according to Embodiment 4 may be applied as a cassette mounting apparatus 411D in which the cassette 2B is mounted and which connects the cassette-side connector 22B of the cassette 2B to the apparatus-side connector of the front-side money handling apparatus 41D. In this case, the cassette 2B is slid in the left direction and, thus, the cassette 2B is mounted in the cassette mounting apparatus 411D. Note that the same configuration as the cassette mounting apparatus 1B according to Embodiment 3 or the cassette mounting apparatuses 1C according to Embodiment 4 may be applied to the back-side money handling apparatus 3D (the second money handling apparatus), or a cassette mounting apparatus that does not comprise a connection processing section may be applied to the back-side money handling apparatus 3D.

The present disclosure is applicable to a cassette mounting apparatus, a money handling apparatus, and a money handling system.

The invention claimed is:

1. A cassette mounting apparatus, comprising:
- an apparatus-side connector connectable to a cassette-side connector of a cassette that stores money;
- a cassette mounting section that enables the cassette to be mounted therein; and
- a connection processing section that connects the apparatus-side connector to the cassette-side connector by moving the apparatus-side connector in a direction closer to the cassette-side connector,
- wherein the connection processing section moves the apparatus-side connector in the direction closer to the cassette-side connector in synchronization with a movement of the cassette being mounted, and
- wherein the connection processing section moves the apparatus-side connector so that the apparatus-side connector is connected to the cassette-side connector when the cassette is mounted in the cassette mounting section.

2. The cassette mounting apparatus according to claim 1, wherein the connection processing section comprises:
- an interlocking section that moves in conjunction with the movement of the cassette when the cassette is mounted in the cassette mounting section; and
- a moving section that moves the apparatus-side connector in the direction closer to the cassette-side connector in accordance with a movement of the interlocking section.

3. The cassette mounting apparatus according to claim 2, wherein the interlocking section is pressed while being in contact with the cassette in accordance with the movement of the cassette when the cassette is mounted in the cassette mounting section so as to move in conjunction with the movement of the cassette.

4. A money handling system, comprising:
- a cassette that stores money and that comprises a cassette-side connector;
- a first money handling apparatus that comprises the cassette mounting apparatus according to claim 3; and
- a second money handling apparatus comprising:
  - an apparatus-side connector connectable to a cassette-side connector of a cassette that stores money;
  - a cassette mounting section that enables the cassette to be mounted therein; and
  - a connection processing section that connects the apparatus-side connector to the cassette-side connector by moving the apparatus-side connector in a direction closer to the cassette-side connector, wherein
- the connection processing section of the second money handling apparatus moves the apparatus-side connector in the direction closer to the cassette-side connector in conjunction with a movement of the cassette when the cassette is mounted in the cassette mounting section,
- the connection processing section of the second money handling apparatus comprises:
  - an interlocking section that moves in conjunction with the movement of the cassette when the cassette is mounted in the cassette mounting section;
  - a moving section that moves the apparatus-side connector in the direction closer to the cassette-side connector in accordance with a movement of the interlocking section;
  - a cassette container that stores the cassette; and
  - a container insertion section into which the cassette container is inserted so that the cassette stored in the cassette container is mounted, and
  - the interlocking section moves in conjunction with a movement of the cassette container when the cassette container is inserted into the container insertion section.

5. The cassette mounting apparatus according to claim 2, wherein the moving section comprises an extensible section that extends to move the apparatus-side connector in the direction closer to the cassette-side connector.

6. The cassette mounting apparatus according to claim 5, wherein the extensible section extends and contracts in a direction perpendicular to a movement direction of the cassette when the cassette is mounted in the cassette mounting section.

7. The cassette mounting apparatus according to claim 2, wherein the moving section moves the apparatus-side connector in a direction that crosses a movement direction of the cassette when the cassette is mounted in the cassette mounting section.

8. The cassette mounting apparatus according to claim 2, wherein the cassette mounting section comprises:
- a cassette container that stores the cassette; and
- a container insertion section into which the cassette container is inserted so that the cassette stored in the cassette container is mounted, and
- wherein the interlocking section moves in conjunction with a movement of the cassette container when the cassette container is inserted into the container insertion section.

9. A money handling apparatus, comprising:
- the cassette mounting apparatus according to claim 2, wherein
- the cassette mounting section comprises:
  - a cassette container that stores the cassette; and a container insertion section into which the cassette container is inserted so that the cassette stored in the cassette container is mounted, the interlocking section moves in conjunction with a movement of the cassette container when the cassette container is inserted into the container insertion section, and the interlocking section is pressed while being in contact with the cassette in accordance with the movement of the cassette when the cassette is mounted in the cassette mounting section so as to move in conjunction with the movement of the cassette.

10. A money handling system, comprising:

a cassette adapted to store money and comprising a cassette-side connector;

a first cassette mounting apparatus; and a second cassette mounting apparatus, wherein either one of the first cassette mounting apparatus and the second cassette mounting apparatus comprises the cassette mounting apparatus according to claim 1.

11. The money handling system according to claim 10, further comprising:

a first money handling apparatus that comprises the first cassette mounting apparatus; and a second money handling apparatus that comprises the second cassette mounting apparatus.

12. A cassette mounting apparatus, comprising:

an apparatus-side connector connectable to a cassette-side connector of a cassette that stores money;

a cassette mounting section that enables the cassette to be mounted therein; and a connection processing section that connects the apparatus-side connector to the cassette-side connector by moving the apparatus-side connector in a direction closer to the cassette-side connector, wherein the connection processing section moves the apparatus-side connector in the direction closer to the cassette-side connector in conjunction with a movement of the cassette when the cassette is mounted in the cassette mounting section, wherein the connection processing section comprises:

an interlocking section that moves in conjunction with the movement of the cassette when the cassette is mounted in the cassette mounting section; and a moving section that moves the apparatus-side connector in the direction closer to the cassette-side connector in accordance with a movement of the interlocking section, wherein the cassette mounting section comprises:

a cassette container that stores the cassette; and a container insertion section into which the cassette container is inserted so that the cassette stored in the cassette container is mounted, wherein the interlocking section moves in conjunction with a movement of the cassette container when the cassette container is inserted into the container insertion section, wherein the apparatus-side connector and the moving section are provided in the cassette container, wherein the interlocking section comprises:

an interlocking member provided in the cassette container; and an interlocking control section that is provided in the container insertion section and that moves the interlocking member in conjunction with the movement of the cassette container, and wherein the moving section moves the apparatus-side connector in the direction closer to the cassette-side connector in accordance with the movement of the interlocking member.

13. A cassette mounting apparatus, comprising:

an apparatus-side connector connectable to a cassette-side connector of a cassette that stores money;

a cassette mounting section that enables the cassette to be mounted therein; and a connection processing section that connects the apparatus-side connector to the cassette-side connector by moving the apparatus-side connector in a direction closer to the cassette-side connector, wherein the connection processing section moves the apparatus-side connector in the direction closer to the cassette-side connector in conjunction with a movement of the cassette when the cassette is mounted in the cassette mounting section, wherein the connection processing section comprises:

an interlocking section that moves in conjunction with the movement of the cassette when the cassette is mounted in the cassette mounting section; and a moving section that moves the apparatus-side connector in the direction closer to the cassette-side connector in accordance with a movement of the interlocking section, wherein the cassette mounting section comprises:

a cassette container that stores the cassette; and a container insertion section into which the cassette container is inserted so that the cassette stored in the cassette container is mounted, wherein the interlocking section moves in conjunction with a movement of the cassette container when the cassette container is inserted into the container insertion section, wherein a removal direction of the cassette container is opposite to an insertion direction of the cassette container, and wherein the moving section comprises:

a holding member that holds the apparatus side connector such that the apparatus side connector is positioned on an insertion direction side of the cassette stored in the cassette container and that is movable in the insertion direction;

a moving member that is provided on a removal direction side of the holding member and that moves in the removal direction in accordance with the movement of the interlocking section when the cassette container is inserted into the container insertion section; and an elastic section that separably connects the holding member to the moving member.

14. The cassette mounting apparatus according to claim 13, further comprising:

an urging section that urges the holding member in the insertion direction, wherein the urging section urges the holding member in the insertion direction by using a force less than an elastomeric force of the elastic section and greater than a connection force that is a force to maintain the connection between the cassette-side connector and the apparatus-side connector.

* * * * *